US006963856B2

(12) United States Patent
Lutnick et al.

(10) Patent No.: US 6,963,856 B2
(45) Date of Patent: Nov. 8, 2005

(54) AUTOMATED PRICE IMPROVEMENT PROTOCOL PROCESSOR

(75) Inventors: Howard Lutnick, New York, NY (US); Stuart Fraser, Armonk, NY (US); Bijoy Paul, North Brunswick, NJ (US)

(73) Assignees: Cantor Fitzgerald, L.P., New York, NY (US); CEPH, LLC, New York, NY (US)

( * ) Notice: Subject to any disclaimer, the term of this patent is extended or adjusted under 35 U.S.C. 154(b) by 29 days.

(21) Appl. No.: 10/251,717

(22) Filed: Sep. 20, 2002

(65) Prior Publication Data

US 2003/0149636 A1 Aug. 7, 2003

Related U.S. Application Data

(63) Continuation of application No. 09/216,464, filed on Dec. 18, 1998, now Pat. No. 6,850,907, which is a continuation-in-part of application No. 08/766,733, filed on Dec. 13, 1996, now Pat. No. 5,905,974.

(51) Int. Cl.$^7$ .............................................. G06F 17/60
(52) U.S. Cl. ....................................................... 705/37
(58) Field of Search .......................................... 705/37

(56) References Cited

U.S. PATENT DOCUMENTS

| | | | | |
|---|---|---|---|---|
| 2,134,118 A | * | 10/1938 | Foss ....................... | 340/825.26 |
| 3,249,919 A | | 5/1966 | Scantlin ................. | 340/825.26 |
| 3,573,747 A | * | 4/1971 | Adams et al. ............. | 705/37 |
| 3,581,072 A | * | 5/1971 | Nymeyer ................... | 705/37 |
| 3,656,148 A | * | 4/1972 | Belcher et al. ............ | 345/2.1 |
| 3,976,840 A | | 8/1976 | Cleveland et al. ........ | 379/93.02 |
| 4,412,287 A | * | 10/1983 | Braddock, III ............ | 705/37 |
| 4,674,044 A | * | 6/1987 | Kalmus et al. ............ | 705/37 |
| 4,677,552 A | * | 6/1987 | Sibley, Jr. ............... | 705/37 |
| 4,789,928 A | | 12/1988 | Fujisaki .................. | 705/37 |
| 4,799,156 A | | 1/1989 | Shavit et al. ............. | 705/26 |
| 4,823,265 A | * | 4/1989 | Nelson .................... | 705/35 |
| 4,903,201 A | * | 2/1990 | Wagner ................... | 705/37 |

(Continued)

FOREIGN PATENT DOCUMENTS

| | | | | |
|---|---|---|---|---|
| EP | 0416482 | | 3/1991 | ............ G07F/7/10 |
| EP | 0512702 | | 11/1992 | ........... G06F/15/21 |
| GB | 2 258 061 | | 1/1993 | ........... G06F/15/30 |
| JP | 62-256164 | | 11/1987 | |
| JP | 62256164 | A * | 11/1987 | |
| WO | WO 95/26005 | | 9/1995 | ........... G06F/17/60 |
| WO | WO 96/34356 | | 10/1996 | ........... G06F/17/60 |

OTHER PUBLICATIONS

Massimb, M.N., et al., "Electronic Trading, Market Structures, and Liquidity," Financial analysts Journal, vol. 50, No. 1, pp. 39–50, Jan.–Feb. 1994.*

Graham, G., "UKNEWS: Electronic Trading: Much More a Small Fizz Than a Big Bang," Financial times, London Edition, p. 9, Oct. 17, 1997.*

Clemons, E.K., et al., "Restructuring Institutional Block Trading: An Overview of the OptiMark System," Journal of Managemen Inforamtion Systems, vol. 15, No. 2, pp. 41–60, Fall 1998.*

(Continued)

*Primary Examiner*—Nicholas D. Rosen
(74) *Attorney, Agent, or Firm*—Fish & Neave IP Group of Ropes & Gray LLP

(57) ABSTRACT

Data processing systems and methods for managing transactions in auction-based trading of specialized items such as fixed income instruments are presented. The data processing system provides a highly structured trading protocol implemented through a sequence of trading paradigms. The system employs a distributed computer processing network linking together a plurality of commonly configured program-controlled workstations. The protocol and its program-controlling logic improves trading efficiency, rewards market Makers, and fairly distributes market opportunity to system users.

12 Claims, 13 Drawing Sheets

U.S. PATENT DOCUMENTS

| | | | | | |
|---|---|---|---|---|---|
| 4,980,826 | A | * | 12/1990 | Wagner | 705/37 |
| 5,038,284 | A | * | 8/1991 | Kramer | 705/37 |
| 5,077,665 | A | | 12/1991 | Silverman et al. | 705/37 |
| 5,101,353 | A | * | 3/1992 | Lupien et al. | 705/37 |
| 5,136,501 | A | * | 8/1992 | Silverman et al. | 705/37 |
| 5,168,446 | A | * | 12/1992 | Wiseman | 705/37 |
| 5,243,331 | A | | 9/1993 | McCausland et al. | 345/172 |
| 5,297,031 | A | * | 3/1994 | Gutterman et al. | 705/37 |
| 5,297,032 | A | | 3/1994 | Trojan et al. | 705/37 |
| 5,305,200 | A | | 4/1994 | Hartheimer et al. | 705/37 |
| 5,361,199 | A | | 11/1994 | Shoquist et al. | 705/26 |
| 5,373,055 | A | | 12/1994 | Ohmae et al. | 525/64 |
| 5,375,055 | A | | 12/1994 | Togher et al. | 705/37 |
| 5,463,547 | A | | 10/1995 | Markowitz et al. | 715/507 |
| 5,689,652 | A | * | 11/1997 | Lupien et al. | 705/37 |
| 5,710,889 | A | * | 1/1998 | Clark et al. | 235/379 |
| 5,715,402 | A | | 2/1998 | Popolo | 705/37 |
| 5,717,989 | A | | 2/1998 | Tozzoli et al. | 705/37 |
| 5,727,165 | A | * | 3/1998 | Ordish et al. | 705/37 |
| 5,787,402 | A | * | 7/1998 | Potter et al. | 705/37 |
| 5,794,219 | A | | 8/1998 | Brown | 705/37 |
| 5,826,244 | A | | 10/1998 | Huberman | 705/37 |
| 5,832,462 | A | | 11/1998 | Midorikawa et al. | 705/35 |
| 5,835,896 | A | | 11/1998 | Fisher et al. | 705/37 |
| 5,842,178 | A | | 11/1998 | Giovannoli | 705/26 |
| 5,873,071 | A | * | 2/1999 | Ferstenberg et al. | 705/37 |
| 5,890,138 | A | | 3/1999 | Godin et al. | 705/26 |
| 5,905,975 | A | * | 5/1999 | Ausubel | 705/37 |
| 5,915,209 | A | | 6/1999 | Lawrence | 340/3.7 |
| 5,924,082 | A | | 7/1999 | Silverman et al. | 705/37 |
| 5,926,801 | A | * | 7/1999 | Matsubara et al. | 705/37 |
| 5,987,419 | A | * | 11/1999 | Hachino et al. | 705/1 |
| 6,014,627 | A | * | 1/2000 | Togher et al. | 705/1 |
| 6,016,483 | A | * | 1/2000 | Rickard et al. | 705/37 |
| 6,029,146 | A | * | 2/2000 | Hawkins et al. | 705/37 |
| 6,134,535 | A | | 10/2000 | Belzberg | 705/37 |
| 6,151,588 | A | * | 11/2000 | Tozzoli et al. | 705/37 |
| 6,230,146 | B1 | * | 5/2001 | Alaia et al. | 705/37 |
| 6,234,535 | B1 | * | 5/2001 | Roberts | 705/37 |
| 6,247,000 | B1 | * | 6/2001 | Hawkins et al. | 705/37 |
| 6,263,321 | B1 | | 7/2001 | Daughtery, III | 705/36 |
| 6,282,521 | B1 | * | 8/2001 | Howorka | 705/37 |
| 6,311,178 | B1 | * | 10/2001 | Bi et al. | 707/3 |
| 6,343,278 | B1 | * | 1/2002 | Jain et al. | 705/37 |
| 6,405,180 | B2 | * | 6/2002 | Tilfors et al. | 705/37 |
| 6,505,174 | B1 | * | 1/2003 | Keiser et al. | 705/37 |
| 6,519,574 | B1 | * | 2/2003 | Wilton et al. | 705/35 |
| 2002/0023037 | A1 | * | 2/2002 | White | 705/37 |
| 2002/0023041 | A1 | * | 2/2002 | Brett | 705/37 |
| 2002/0091626 | A1 | * | 7/2002 | Johnson et al. | 705/37 |
| 2003/0050888 | A1 | * | 3/2003 | Satow et al. | 705/37 |
| 2004/0030634 | A1 | * | 2/2004 | Satow et al. | 705/37 |

OTHER PUBLICATIONS

Liberty Brokerage Investment Corp., et al., v. Cantor Fitzgerald, L.P., et al., C.A. No. 99–522 RRM Complaint for Declaratory Relief.

Liberty Brokerage Investment Corp., et al., v. Cantor Fitzgerald, L.P., et al., C.A. No. 99–522 RRM Amended Complaint for Declaratory Relief.

Liberty Brokerage Investment Corp., et al., v. Cantor Fitzgerald, L.P., et al., C.A. No. 99–522 RRM Stipulated order of Dismissal.

Ray, Christina I., The Bond Market, pp. 59–69, 1993.

Umlauf, Steven R. "Information Asymmetries and Security Market Design: An Empirical Study of the Secondary Market for U.S. Government Securities," The Journal of Finance, vol. 46, No. 3, pp. 929–953, Jul. 1991.

"U.S. Government Securities—More Transaction Information and Investor Protection Measures Are Needed," United States General Accounting Office, Report to Congressional Committees, pp. 1–10, 95–112, (Sep. 1990).

eSpeed, Inc. et al. v. Brokertec USA, L.L.C. et al., C.A. No. 03–612 (KAJ) Answer and Counterclaim.

eSpeed, Inc. et al. v. Brokertec USA, L.L.C. et al., C.A. No. 03–612 (KAJ) Notice of Subpoena Duces Tecum.

eSpeed, Inc. et al. v. Brokertec USA, L.L.C. et al., C.A. No. 03–612 (KAJ) Supplemental Answers and Objections to Plaintiffs' First Set of Interrogatories.

Adam, Nigel, "Exxon's Quiet Auction Brings Uproar to Wall Street," Euromoney pp. 39–45, (Dec. 1982).

Angrist, Stanley W., "Iowa Market Takes Stock of Presidential Candidates," The Wall Street Journal, Money & Investing Update, Aug. 28, 1995.

Aversa, Jeannine, "Bidding In High–Tech Airwaves Auction to be Handled by Computer, of course," Buffalo News, p. A–10, Dec. 5, 1994.

Bailey, Dee Von, et al., "Identifying Buyer Market Areas and the Impact of Buyer Concentration in Feeder Cattle Markets Using Mapping and Spatial Statistics," American Journal of Agricultural Economics, vol. 77, No. 2, pp. 309–318, May 1995.

Bailey, DeeVon, et al., "A Comparison of Video Cattle Auction and Regional Market Prices," American Agricultural Economics Association, pp. 465–475, (May 1991).

Banatre, Jean–Pierre, et al., "The Design and Building of Enchere, A Distributed Electronic Marketing System," Communications of the ACM, vol. 29, No. 1, pp. 19–29, (Jan. 1986).

Banatre, Michel, "Enchere: A Distributed Auction Bidding System, External Characteristics and General Design Considerations," The International Computing Symposium—Systems Architecture, pp. 10–21, 1981.

Banatre, Michel, "Distributed Auction Bidding System," Computer Communications, vol. 4, No. 4 pp. 179–186, (Aug. 1981).

Banning, Edward, "About Coins Rare Coin Auctions Enter the Video Technology Era," May 23, 1987, The Globe and Mail, p. E18.

Batchelor, Charles, "Reuters Takes on the Stock Exchange," Financial Times, UK News, May 23, 1985.

Beam, Carrie, et al., "CXN: A Case Study," CMIT Working Paper 97–WP–1025, pp. 1–13.

Beam, Carrie, et al., "Electronic Negotiation Through Internet–Based Auctions," CITM Working Paper 96–WP–1019, pp. 1–35, Dec. 1996.

Beeder, David C., "Video Auction Attracts 300 Cattlemen," The Omaha World–Herald, Feb. 8, 1985.

Belsie, Laurent, "Details and Delays Bog Down FCC Bid to Try New Auction System Former us fo Lottery Fails to build Base for new Technologies," Christian Science Monitor, p. 8, Apr. 25, 1994.

Berss, Marcia, "With CapitalLink, the commercial bankers would take another step onto Wall Street's turf. Merrill Lynch is fighting back," Forbes, pp: 42–43, (May 28, 1990).

Bertin, Oliver, "Cattle Auctions are on the Road to Extinction," The Globe and Mail, p. B1, Mar. 15, 1982.

Bertsekas, D.P., et al., "A forward/reverse auction algorithm for asymmetric assignment problems," Computational Optimization and Applications, vol. 1, No. 3, Dec. 1992, Abstract.

Bichler, Martin, et al., "Multi-Attribute Auctions for Electronic Procurement," available at www.econjit.edu/bartel/NegroPap/multiattributeauctions.pdf,1999, (13 pages).

Bikchandani, Sushil, et al., "The Economics of Treasury Securities Markets," *Journal of Economic Perspectives*, vol. 7, No. 3, pp. 117–134, (Summer 1993).

Bisbee, Dana, "Museum Fund–Raiser is Sold on the Internet," Boston Herald, May 22, 1995, p. 33.

Bollestev, Tim, et al., "Some Effects of Restricting the Electronic Order Book in an Automated Trade Execution System," an Article in *The Double Auction Market*, pp. 221–252, 1993.

Booker, Ellis, "Mega Real Estate Auction Counts on Imaging," Computerworld, Dec. 7, 1992.

Brown, David, "Bids go Sky High at Satellite Cattle Sale," The Daily Telegraph, Oct. 31, 1992, p. 9.

Bryant, Adam, "Looking for Low–Price Airline Tickets?—Take Quick Trip to Internet Auction," The Commerical Appeal (Memphis), Business, p. 5B, May 14, 1996.

Bryant, Adam, "Am I Bid Six? Click to Bid Six!; Airlines Are the Latest to Move to On–Line Auctions," The New York Times, p. D1, May 13, 1996.

Byrne, John, "Special Feature: Is the Reform Worse Than the Problem? A Stock Market Chief Takes a Second Look at the SEC's History of Breaking up Dealer Monopolies," Traders Magazine, Dec. 1, 1999.

Bunker, Ted, "How Auction Technology Sped and Enhanced Sale of Radio Licenses," Investor's Business Daily, p. A3, Feb. 24, 1995.

Burden, Peter, "Pig Men Plug Into Computers," Australian Financial Review, p. 37, Sep. 19, 1984.

Burrus, Victoria, "The Change Page–The Virtual Stockyard Herd Instincts/Today's Ranchers are as Likely to be Punching Computers as Steers. The Electronic Auction has become an Established part of the Cattle Business—and the Salvation of One Auction Company," The Globe and Mail, p. B28, Sep. 27, 1994.

Carey, Christopher, "Firm Offers Auction for Airline Tickets," St. Louis Post–Dispatch, Inc., p. 1B, Aug. 7, 1991.

Carlsen, Clifford, "From Airline Tickets to Human Organs, the Electronic Markets are Booming," San Francisco Business Times, vol. 3, No. 50, Sec. 1, p. 17, Aug. 14, 1989.

Cassady, Jr., Ralph, *Auctions and Auctioneering*, "Modern Communication Systems," pp. 193–208, 1967.

Castro, Laura L., "Fish Sales Flounder in Brooklyn, " City Newsday, p. 13, Dec. 19, 1987.

Cavalier, Rodney, "Micro–Chip V. Saleyard," Australian Financial Review, p. 47, Aug. 15, 1988.

Chamberlain, Art, "Cyber–Shopping Made Safe Encrypted System Created to Block Hackers from Stealing Credit Card Numbers on the Internet," The Toronto Star, May 25, 1996, p. C3.

Charlier, Marj, "Video Auctions Could Spell End For Stockyards," The Wall Street Journal, Nov. 2, 1988.

Charton, Scott, "Video Livestock Auctions Don't Dirty Buyers' Boots," Houston Chronicle, p. 3, Feb. 18, 1991.

Cole, Jeff, "Fare Bidding Plan Could Be The Ticket," St. Paul Pioneer Press Dispatch–Business, Mar. 11, 1990 (2 pages).

Cohen, Kalman, et al., "An Electronic Call Market: Its Design and Desirability," in *The Challenge of Information Technology for the Securities Markets Liquidity, Volatility, and Global Trading*, pp. 15–57, 1989.

Cohen, Norma, "Day of Reckoning for Stock Exchange: Board to Decide on Launch of an Alternative to the Quote–Driven Trading System, "Financial Times (London), p. 15, Nov. 30, 1995).

Cohen, Norma, "Stock Exchange Rejects Trading Shake–Up," Financial Times (London), Oct. 23, 1995, p. 22.

Cohen, Norma, "Stock Exchange to Debate Hybrid Market Plans," Financial Times (London), pp. 6, Nov. 27, 1995.

Coleman, Zach, "Electronic Trading System Matches Buyers, Sellers," *Atlanta Business Chronicle*, vol. 20, No. 12, p. 37A, Aug. 22–28, 1997.

Coggan, Philip, Weekend Money: Making Sense of the market Maze—Where's best to invest?, Nov. 4, 1995, p. 1.

Connor, John, "House Panel Wants Treasury To Protect Computer Auction System," *Dow Jones News Service–Ticker*, Jul. 8, 1993.

Connor, John, "GAO—Automated Tsy Auctions Cut Time, But Problems Remain," *Dow Jones News Service–Wall Street Journal Combined Stories*, Sep. 6, 1994.

Court, Chris, "Armchair Market Plan For Livestock Farmers," Press Association Newsfile, Nov. 8, 1992.

Court, Chris, "Satellite Link Takes Armchair Market to Farmers," Press Association Newsfile, Jul. 12, 1992.

Court, Chris, "Farmers Buy Cattle by Satellite," Press Association Newsfile, May 20, 1993.

DelRosso, Laura, "Marketel says It Plans to Launch Air Fare 'auction' in June," *Travel Weekly*, vol. 50, No. 34, Apr. 29, 1991, (2 pages).

DeSilva, Janet, "Wool Unravels the Past," Australian Financial Review, p. 1, May 5, 1989.

Domowitz, Ian, "The Mechanics of Automated Trade Execution Systems," *Journal of Financial Intermediation*, vol. 1, pp. 167–194 1990.

Domowitz, Ian, "A Taxonomy of Automated Trade Execution Systems," *Journal of International Money and Finance*, vol. 12, pp. 607–631, 1993.

Domowitz, Ian, "An Exchange Is a Many Splendored Thing: The Classification and Regulation of Automated Trading Systems," in *The Industrial Organization and Regulation of the Securities Industry*, pp. 93–123, 1996.

Domowitz, Ian, "Automating the Continuous Double Auction in Practice: Automated Trade Execution Systems in Financial Markets," an Article in *The Double Auction Market*, pp. 27–60, 1993.

Domowitz, Ian, "Automating the Price Discovery Process: Some International Comparisons and Regulatory Implications," *Journal of Financial Services Research* pp. 305–326, 1992.

Domowitz, Ian, "Equally Open and Competitive: Regulatory Approval of Automated Trade Execution in the Futures Market," *The Journal of Futures Markets*, vol. 13, No. 1, pp. 93–113, 1993.

Dyson, Ester, "Information, Bid and Asked," *Forbes*, Aug. 20, 1990, p. 92.

Economides, Nicholas, et al., "Electronic Call Market Trading," *The Journal of Portfolio Management*, pp. 10–18, Spring 1995.

Fainaru, Steve, "What Overnight Market? Heralded as Wave of the Future, After–hours Stock Trading Has Been Greeted With Yawns," The Boston Globe, p. A1, Jul. 31, 1994.

Feinberg, Andrew, "Fears of Inflation aren't the Only Thing Driving the Bull Market for Stamps, STAMPEDE!," Venture, pp. 26–27, (Sep. 1987).

Feldman, Joan M., "To Rein in Those CRSs," Air Transport World, at 89, Dec. 1991, (7 pages).

Ferris, Stephen P., "Automated Trade Execution and Trading Activity: The case of the Vancouver Stock Exchange," *Journal of International Financial Markets, Institutions and Money*, vol. 7, pp. 61–72, 1997.

Field, Michael, "Buy Equity and Stay Married," Euromoney, n318, pp. 74–76, Oct. 1995.

Fischetti, Mark, "The Rise of E–Business," Think Research Magazine, Dec. 26, 1999 (3 pgs.).

Fowler, David, "The Future of the Internet as a Business Marketing Platform," Telecommunications, (Oct. 1994), p. 77.

Fox, Nicolette, "The Calm Way of Buying and Selling Livestock," Sydney Morning Herald, p. 23, Oct. 10, 1988.

Francioni, Reto, "The German Equities Market," Chapter 30, pp. 473–484 in *Global Equity Markets: Technological, Competitve, and Regulatory Challenges*, ed. Robert A Schwartz, 1995.

Franklin, Matthew K., et al., "The Design and Implementation of a Secure Auction Service," *Transactions of the American Nuclear Society*, vol. 62, pp. 2–14, Sheraton Washington Hotel, Washington, D.C. (Nov. 11–15, 1990).

Frazier, Deborah, "Cattle Star in Stock Show's Satellite Video Auction Two–Day Bellringer Brought $30 million as ranchers from 35 States Tuned in," Rocky Mountain News, Jan. 14, 1995, p. 50A.

Frino, Alex, et al., "The Liquidity of Automated Exchanges: New Evidence from German Bund Futures," *Journal of International Financial Markets, Institutions and Money*, vol. 8, pp. 225–241, 1998.

Fritschner, Sarah, "Matchmaker for The Horsey Set," *American Demographics*, pp. 48–50, (Jun. 1988).

Gaines, B.R., et al., "Minicomputers in Security Dealing," Computer, vol. 9, No. 9, pp. 6–15, Sep. 1976.

Gapper, John, "Stock Exchange Rival has Slow Start," Financial Times (London), Dec. 27, 1995, p. 5.

Garbade, Kenneth D., "The Effect of Interdealer Brokerage on the Transacational Characteristics of Dealer Markets," *Journal of Business*, vol. 51, No. 3, pp. 477–498, (Jul. 1978).

Gilbertson, Dawn, "Wall Street West; Arizona Stock Exchange Battles for More Volume," The Phoenix Gazette, p. B5, Mar. 30, 1993.

Goodhert, Charles et al., "One Day in Jun. 1993: A Study of the Working of the Reuters 2000–2 Electronic Foreign Exchange Trading System," pp. 107–182, *The Microstructure of Foreign Exchange Markets*, 1996.

Goodman, Ann, "Back to the Future," Wall Street & Technology, vol. 9, No. 6, pp. 30–36 and 71, Feb. 1992.

Gordon, Pat, "New Brand of Video Cattlemen move'em out by Making Movies for Livestock Auctions," The Dallas Morning News, p. 15A, Nov. 2, 1987.

Greenberg, Peter S., "The Savvy Traveler: Lower Air Fares for Consumers not in the Cards; Airline: Remember when it cost $16 to Fly from Los Angeles to San Francisco? Then you Remember the days before deregulation. Since then, prices have soared," Los Angeles Times, part L, p. 2, Jul. 8, 1990.

Grody, Allan D., et al., "Global Electronic Markets, A Preliminary Report of Findings," Working Paper Series, STERN #IS–95–18, May 31, 1994, pp. 1–35.

Grody, Allan D., et al., "Past, Present and Future: The Evolution and Development of Electronic Financial Markets," Working Paper Series IS–95–21, Nov. 1993.

Grover, Christopher F., "What Price, Art?," *CD–ROM World*, pp. 72–73, (Sep. 1994).

Hamon, Jacques, et al., "Market Structure and The Supply of Liquidity," Chapter 5, pp. 76–89 in *Global Equity Markets: Technological, Competitve, and Regulatory Challenges*, ed. Robert A Schwartz, 1995.

Handa, Puneet, et al., "The Ecology of an Order–Drive Market," *The Journal of Portfolio Management*, pp. 47–55, Winter 1998.

Hands, Puneet, et al., "How Best to Supply Liquidity to a Securities Market," *The Journal of Portfolio Management*, pp. 44–51, Winter 1996.

Hansell, Saul, "Will Bill Donaldson Go the Way of Gobachev," Institutional Investor, Feb. 1992.

Harris, Lawrence, *Monograph Series in Finance and Economics–Liquidity, Trading Rules and Electronic Trading Systems*, pp. 1–59, 1991.

Harverson, Patrick, "Age of Automation Reaches New York Bond Auctions—From Today, Dealers Will Bid By Computer on the World's Largest Securities Market," Financial Times (London), p. 33, Apr. 29, 1993.

Harverson, Patrick, "Bond Auctions Go Modern: New York Computers take over from Sheets of Paper and Boxes," *The Financial Post Daily*, p. 50 May 4, 1993.

Hawkins, Phil, et al., "Illiquid Bonds, Stocks To Hit Auction Block, " Investor's Daily Inc., p. 30, Jun. 15, 1990.

Heck, Eric Van, et al., "Experiences with Electronic Auctions in the Dutch Flower Industry," Electronic Markets, vol. 7, No. 4, pp. 29–34, 1977.

Henkel, Tom, "Automated Stock Exchange Replacing Humans," *ComputerWorld*, p. 36 (Feb. 14, 1983).

Hollington, Simon, "Armchair Auctions Set to Replace Market Day," The Independent (London), Jul. 6, 1992.

Horowitz, Jed, "AZX Tries Again, Hoping New Auction Lures Traders," Investment Dealers' Digest, Jun. 9, 1997 (2 pages).

Inhaber, Herbert, "How to Solve the Problem of Siting Nuclear Waste," pp. 61–62, MRS Facility: Would Repository Collocation Be a Solution?.

Jackson, Ted, "Bloomberg's Next Step: The Instinet Killer?," *Wall Street & Technology*, vol. 14, No. 8, pp. 34–38, Aug. 1996.

Jones, Chris, "Trade'ex readies Java–based Market Maker," *Infoworld*, (Oct. 28, 1996).

Kambil, Ajit et al., "Information Technology, Competition and Market Transformations: Re–engineering the Dutch Flower Auctions," Working Paper Series, STERN#IS–95–1, (Jan. 1995).

Kedrosky, Peter, "Internet Liquidators:www.internetliquidators.com," pp. 1–28, 1997.

Killian, Raymond L., et al., "The Effect of Liquidity on Electronic Order Routing," Chapter 4, pp. 67–75 in *Global Equity Markets: Technological, Competitve, and Regulatory Challenges*, ed. Robert A Schwartz, 1995.

Klein, Lisa, *"TRADE'ex: The Stock Exchange of the Computer Industry"*, Harvard Business School document 9–597–99, Sep. 22, 1998, (14 pages).

Klein, Stephan, "Introduction to Electronic Auctions," Electronic Markets–International Journal of Electronic Markets, vol. 7, No. 4, 1997, pp. 3–23.

Klemperer, Paul, "Auction Theory: A Guide to the Literature," *Journal of Economic Surveys*, vol. 13, No. 3, pp. 227–286, (Jul. 1999).

Korper, Steffano, et al., "Auction Technology," *The E-Commerce Book, Building the E-Empire*, Auction Technology, Chapter 10, pp. 211–230, 2000.

Kuklenski, Valerie, "Rock Art for Sale on Computer Web," *United Press International*, Apr. 24, 1995.

Kumar, Manoj, et al., "Internet Auctions," IBM Research Division, available at www.research.imb.com/iac/papers/auction.fp.pdf.

Kuttner, Robert, "Computers may turn the World into One Big Commodities Pit," Business Week, p. 17, Sep. 11, 1989.

Lacy, Allen, "Gardening: Bidding for Blossoms," The Wall Street Journal, Feb. 22, 1984.

Lee, Ho Geun, et al., "AUCNET: Electronic Intermediary for Used–Car Transactions," *Focus Theme*, International Journal of Electronic Market, pp. 24–28, Dec. 1997.

Lee, Ho Geun, "Do Electronic Marketplaces Lower the Price of Goods?," *Communications of the ACM*, vol. 41, No. 1, Jan. 1998, pp. 73–80.

Lee, Ruben, *What is an Exchange? The Automation, Management, and Regulation of Financial Markets*, pp. 279–394, 1998.

Leinweber, David et al., "A Little Artificial Intelligence Goes a Long Way on Wall Street," Institutional Investor, Winter 1996.

Leinweber, David, "Using Information from Trading in Trading and Portfolio Management," The Journal of Investing, The Journal of Investing, vol. 4, No. 2, p. 40, Summer 1995.

Levecq, Hugues, et al., "Electronic Trading Systems: Strategic Implications of Market Design Choices," Working Paper, STERN #IS–95–19, 1995.

Lewis, Peter H., "Auction of Collectibles on the Internet," The New York Times, p. D4, May 23, 1995.

Littlefair, T., "Homelink: a unique service," *Computer Bulletin*, pp. 12–13, (Jun. 1986).

Lux, Hal, "Institutional Stock Exchange Puts Order Book on the Web; AZX Experiments with a New Way to Reach Investors," Investment Dealers' Digest, p. 6, Nov. 20, 1995.

Lux, Hal, "New Arizona Exchange Opens with Decent, Steady Volume; Trading Systems Increase Pressure on Exchanges," Investment Dealers' Digest, p. 6, Apr. 20, 1992.

Lux, Hal, "Stock Exchanges Hold Talks on New Joint Trading System; Inventors could Gain New Access to Equity Floors," Investment Dealers' Digest, p. 6, Dec. 7, 1992.

Lux, Hal, "Vision Test: Can Steve Wunsch Build a Better Exchange?"Investment Dealers' Digest, p, 18, Sep. 17, 1990.

MacConnell, Sean, "Video Stars for New Pastures," The Irish Times, Jul 24, 1993, p. 13.

Madden, Bartley et al., "Structural Changes in Trading Stocks," The Journal of Portfolio Management, Fall 1993 (11 pages).

Markoff, John, "Breaking Up Computer Traffic Jams," The Orange County Register, p. d5, May 25, 1989.

Markoff, John, "Can Xerox Auction Off Hot Air?" The New York Times, p. D5, Jun. 24, 1996.

Markoff, John, "Spawning a New Way to Buy Time," Sydney Morning Herald, May 8, 1989, p. 22.

Massimb, Marcel, et al., "Electronic Trading, Market Structure and Liquidity," Financial Analysts Journal, vol. 50 No. 1, pp. 39–50, Jan.–Feb. 1994.

Mastery, Mary Ann, "Going, Going, Gone, Electronic bidding devices are usurping physical contact at Japan's car auctions," Automotive News, (Nov. 26, 1990) p. 6.

Matthew, Janet, "OTC Success Spurs Specialized Trading Systems," Wall Street Computer Review, pp. 26–28 and 32–38, Sep. 1989.

Maynard, Therese H., "What is an "Exchange?"—Proprietary Electronic Securities Trading Systems and The Statutory Definition of an Exchange," Washington and Lee Law Review, vol. 49, No. 3, Summer 1992, pp. 833–912.

McCabe, Kevin et al., "Institutional Design for Electronic Trading," Chapter 8, pp. 121–156 in *Global Equity Markets: Technological, Competitve, and Regulatory Challenges*, ed. Robert A Schwartz, 1995.

McGookin, Stephen, "Media Futures: Cyber Sightings," Financial Times (London), Oct. 30, 1995.

McInish, Thomas, H., et al., "Hidden Limit Orders on the NYSE," *The Journal of Portfolio Management*, pp. 19–26, Spring 1995.

McMillian, John, "Selling Spectrum Rights," *Journal of Economic Perspectives*, vol. 8, No. 3, pp. 145–162, Summer 1994.

Meissner, Frank, "Centralized electronic marketing systems improve trading of agricultural commodities," *Marketing News*, at 14 (Nov. 27, 1981).

Metcalfe, Rod, "Cattle Sale on Videotape," Australian Financial Review, Mar. 22, 1985, p. 26.

Michaels, Jenna, "Customized Listed Contracts," Wall Street & Technology, vol. 10, No. 10, pp. 56–62, May 1993.

Milgrom, Paul, "Auctions and Bidding: A Primer," *Journal of Economic Perspectives*, vol. 3, No. 3, pp. 3–22, Summer 1989.

Miller, Greg, "Celebrity Auctions are Going, Going . . . Online," Los Angeles Times, May 13, 1996.

Miller, Ross M., "The Design of Decentralized Auction Mechanisms That Coordinate Continuous Trade in Synthetic Securities," *Journal of Economic Dynamics and Control*, vol. 14, pp. 237–253, (1990).

Miniclier, Kit, "Livestock Buyers to put $50 Million on the line 'Home on the Range'to be Sold Via Film," Denver Post, p. 23A, Jan. 9, 1994.

Mitchell, Constance, "Big Junk Bond—Players to Try Weekly Auction," The Wall Street Journal, p. C15, Jun. 14, 1990.

Mitchell, Russell, "The Corporation How GE is Electrifying the Auto–Auction Business—GECC's Deep Pockets are helping to Make It No. 1," *Business Week*, p. 68(3 pgs.), May 16, 1988.

Mitchener, Brandon, "On Election Bourse, Race Is Wide Open; German Contest Remains Close for Buyers of Political 'Shares'," International Herald Tribune (Neuilly-sur–Seine, France), Oct. 13, 1994.

Montgomery, Johnnye, "MOOTV: Airwave Auction Technology Transforms a Decades–old Tradition," The Dallas Morning News, p. 33A, Jan. 6, 1991.

Moon, Youngme, "Onsale, Inc.," Article 5–500–022 from Harvard Business School, Teaching Note, pp. 1–14, Aug. 23, 1999.

Moon, Youngme, "Onsale, Inc." Article 9–599–091 from Harvard Business School pp. 1–17, May 17, 1999.

Munro, Don, et al., "A New Way to Purchase Travel," Business Travel News, Issue No. 158, Nov. 6, 1985.

Munshi, Jamal, *Stock Exchange Automation*, pp. 1–48, 73–94, 1994.

Noack, David, "First Stop for Some Lies in Cyberspace," The Record, p. T01, Feb. 19, 1995.

Neo, Boon Siong, "The implementation of an electronic market for pig trading in Singapore," *Journal of Strategic Information Systems*, vol. 1, No. 5, pp. 278–287, (Dec. 1992).

Nomani, A., "Public May Submit Bids to get Bargain Rates," The New York Times Company: Abstracts, Wall Street Journal, Sec. 2, p. 1, Aug. 1, 1989.

Nomani, Asra Q., "Airline Industry Cutting More Fares for Fall Vacations," Wall Street Journal, p. B1, Aug. 21, 1991.

Nelson, Janet, "Airlines Relaxing Policy on No–Refund Tickets," The New York Times, sec. 5, p. 3, Sep. 22, 1991.

Nyberg, Bartell, "Sale at Video Auction a Record but Prices Hurt by Chicago Probe," Denver Post, p. 1, Jan. 20, 1989.

Ogura, Masao, "Here Come The Little Guys!," *Tokyo Business*, pp. 4–11, (Feb. 1995).

O'Sullivan, Orla, "Auctions to Be Computer–Orchestrated," *National Thrift News, Inc.*, p. 15 Mar. 14, 1994.

Parameswaran, Manoj, et al., "Electronic Markets and the Logistics of Digital Products," *Center for Research in Electronic Commerce The University of Texas, Austin*, Jan. 1999, (16 pages).

Parkes, David C., "iBundle: An Efficient Ascending Price Bundle Auction," pp. 148–157, available at www.eecs.harvard.edu/econs/pub/ibundle.pdf, (1999).

Pelline, Jeff, "Going Once, Going Twice, Going Online," The San Francisco Chronicle, Business: p. B1, Nov. 13, 1995.

Pelline, Jeff, "Travelers Bidding On Airline Tickets SF Firm Offers Chance for Cut–Rate Fares," The San Francisco Chronicle, p. A4, Aug. 19, 1991.

Peltz, Michael, "Instinet's Identity Crisis," Institutional Investor, p. 53, Nov. 1995.

Piton, Margaret, "Budget Travel—New Service gives access to a choice of airline fares U.S. Flights only. A bidding system called Bookit sounds complicated and requires access to a fax machine, but it has advantages," The Globe and Mail, p. F5, Sep. 21, 1991.

Quiddington, Peter, "Fish Markets Plan Auctions On–Line," Sydney Morning Herald, p. 4, Mar. 28, 1988.

Reed, Dan, "Airlines Go On Line to Cut Costs; Carriers try to Fill More Seats, Lowering Ticketing Expenses," The Fort Worth Star–Telegram–Business, p. 1, Apr. 13, 1996.

Reiley, David Lucking, Auctions on the Internet: What's Being Auctioned, and How?, Aug. 14, 1999, p. 1–54.

Reiley, David Lucking, "Vickrey Auctions Predate Vickrey," *Journal of Economic Perspectives*, pp. 1–10, Jun. 1999.

Resnick, Paul, et al., "Roles for Electronic Brokers," available at http://ccs.mit.edu/papers/CCSWP179.html, printed on Sep. 8, 1997 (11 pages).

Rockoff, Todd E. et al., "Design of an Internet–Based System for Remote Dutch Auctions," *Internet Research: Electronic Networking Applications and Policy*, vol. 5, No. 4, pp. 10–16, (1995).

Rohrer, Julie, "Steve Wunsch's Uphill Battle," *Institutional Investor*, pp. 103–107 (Dec. 1988).

Rosenblatt, Robert A., "New Treasury Auction System is Criticized Securities: Agency Plans to Begin Computerized Operations Today Despite GAO Objections," *Los Angeles Times*, p. 1, Apr. 29, 1993.

Rosenthal, Mindy, "Electronic Mortgage–And Asset–Backed Trading System Nears Launch," Institutional Investor, Inc.—Bondweek, vol. XI, No. 18, p. 1, May 6, 1991.

Rust, John, et al., "Behavior of Trading Automata in a Computerized Double Auction Market," an Article in *The Double Auction Market*, pp. 155–198, Addison–Wesley, 1993.

Sales, Robert, "Nasdaq ECNs: A Brave New World," *Wall Street & Technology*, Vo. 16, No. 8, pp. 28–32, Aug. 1998.

Sales, Robert, "Sec to Wall Street . . . Play Fair with the Little Guy," *Wall Street & Technology*, vol. 15, No. 1, p. 42–48, Feb. 1992.

Sammer, Harald W., "Online Stock Trading Systems: Study of an Application," (2 pages).

Sanders et al., "Auctioning by Satellite using Trusted Third Party Security Services," in "Information Security the Next Decade, Proceedings of the IFIP TC11 Eleventh International Conference on Information Security, IFIP/Sec '95," pp. 205–219, 1995.

Schmerken, Ivy, "Oh What Memories!," *Wall Street & Technology*, Jun. 18, 2002.

Schneider, Anna Rubino, "Information Processing High Tech Comes to the Tulip Bed—Facing Competition and High Costs, The Dutch are Using Computers to turn Farms into Flower Factories," Business Week, p. 72D, May 12, 1986.

Schroeder, Mary, "An Insider's Guide," Securities Industry News, Jan. 17, 2000.

Searles, Denis, M., "No need to hoof it to Video Cattle Auction Satellite Technology from Colorado firm Connects Buyer, Seller," Rocky Mountain News, p. 3A, Apr. 30, 1993.

Segev, Arie, et al., "Brokering Strategies in Electronic Commerce Markets," pp. 167–176, presented at ACM Conference on Electronic Commerce, Nov. 1999.

Selby, Beth, et al., "Steve Wunsch's Wall Street Southwest," Institutional Investor, p. 12, Feb. 1992.

Shahan, Catherine, "Public Television Station Holds On–line Computer Auction," Feb. 11, 1987.

Sheppard, Robert, "Western Cattle Make Star Trek to help Bridge Regional Gap," The Globe and Mail, p. 14, Oct. 29, 1983.

Sinclair, Joseph T., *eBay the Smart Way–Selling, Buying, and Profiting on the Web's #1 Auction Site*, pp. 3–11, 1999.

Sirri, Erik, "Jefferies & Company: ITG," Article 9–294–952 from Harvard Business School, pp. 1–24, Nov. 1, 1993.

Smith, Carrie, R., "Futures Exchanges Go for Global Links," Wall Street & Technology, vol. 12, No. 13, pp. 20–24, May 1995.

Smith, Terry, "The Good, The Bad and The Ugly," Management Today, pp. 54–60, Sep. 1995.

Stutz, Bruce, "New York Forum About Town—Fishport's Bait Nets a Loss," Newsday, p. 66, Feb. 2, 1990.

Sviokla, John, et al.,"AUCNET: Teaching Note," Harvard Business School Publication 5–396–280, Feb. 21, 1997 (25 pages).

Szabo, Nick, "Smart Contracts," pp. 1–8, 1994, available at http://szabo.best.vwh.net/smart.contracts.html.

Taylor, John, "Selling Without the Smelling Televised Auction will sell About 25, 000 Head of Cattle," The Omaha World–Herald, Bulldog, Mar. 23, 1988.

Thomas, Charles M., "Real–time computer auction bows," *Automotive News*, p. 52, (Feb. 7, 1994).

Tomkins, Richard, "Passengers take a Seat at the Internet Auction: Richard Tomkin on Airlines' Ventures into Cyberspace in their quest to fill unused Capacity," The Financial Times Limited, Financial Times (London), Jun. 17, 1996.

Toner, Ann, "Hogs Sold in High–Tech Bidders Linked Through Satellite," The Omaha World–Herald, p. 3M, Sep. 11, 1994.

Varian, Hal R., "Economic Mechanism Design for Computerized Agents," *First USENIX Workshop on Electronic Commierce*, pp. 13–21, Jul. 11–12, 1995.

Wallace, Anise C., "Market Place: A Wary Response to 'Junk' Auction," The New York Times Company, Aug. 13, 1990, p. D4.

Wang, Jianxin, "Asymmetric Information and the Bid–ask Spread: an Empirical Comparison between automated order execution and open outcry auction," *Journal of International Financial Markets, Institutions and Money*, vol. 9, pp. 115–128, 1999.

Warbelow, Art, et al., "AUCNET: TV Auction Network System," Harvard Business School Publication 9–190–001, Rev. Apr. 12, 1996, originally published Jul. 19, 1989 (15 pages).

Warbelow, Arthur W., Electronic Market Access Forums in Non–Homogeneous Markets: An Exploratory Study of Environmental, Market Structure, and Managerial Considerations, (A thesis presented by Arthur W. Warbelow, Harvard University), (1992).

Ware, James, P., *The Search for Digital Excellence*, McGraw–Hill, pp. 235–243, Jul. 8, 1998.

Warneke, Kent, "Omaha to See First Video Cattle Sale Today," The Omaha World–Herald, Bulldog, Feb. 7, 1985.

Waters, Richard, "The Price of a Share in the Cake/Are Structural Problems in the US Stock market Being Obscured?" Financial Times (London), p. 16, Jan. 31, 1994.

Watson, Catherine, "Dutch Flower Auctions are Fast–Paced, Mystery Blend of Nature, Technology," Star–Tribune Newspaper of the Twin Cities Mpls.—St. Paul, p. 13G, Feb. 12, 1995.

Wayner, Peter, "Time and Money," BYTE, pp. 252–258, Apr. 1990.

Wernle, Bradford, "Aucnet Plans New Channel for Used Cars," *Crain Communications, Inc.*, Section: News: p. 54, Feb. 19, 1996.

Williams, Arlington, W., "Computerized Double–Auction Markets: Some Initial Experimental Results," *Journal of Business*, vol. 53, No. 3, pp. 235–258, (1980).

Williams, Monci Jo., "Why the Big Players Want a Piece of Instinet," Fortune, p. 129, Aug. 19, 1985.

Wilson, Robert, "Design of Efficient Trading Procedures," an Article in *The Double Auction Market*, pp. 125–152, 1993.

Wren, Worth, "Cattle Auctions Step into the Electronic Age," The Fort Worth Star–Telegram, p. 4, Jan. 28, 1991.

Wunsch, Steven, "The Single–Price Auction," pp. 279–290, *The Complete Guide to Securities Transactions*, ed. by Wayne Wagner, 1989.

Wunsch, Steven, Time to Change Open Outcry Method, (3 pages).

Wurman, Peter R., et al., "A Control Architecture for Flexible Internet Auction Servers," University of Michigan, pp. 1–12, Feb. 6, 1999.

Wurman, Peter R., et al., "Flexible Double Auctions for Electronic Commerce: Theory and Implementation," *Decision Support Systems* vol. 24, pp. 17–27, (1998).

Zampetakis, Helene, "Computers put Fish Auctions on Much More Efficient Scale," Australian Financial Review, p. 47, Oct. 30, 1989.

"Airline Seats May Go on the Auction Block," Insight on the News, Dec. 4, 1989.

"An Electronic Auction Ahead for Airline Crisis?," The BusinessWeek Newsletter for Information Executives, Oct. 27, 1989.

"Arizona Stock Exchange Opportunity Knocks," The Arizona Republic, p. A14, Nov. 22, 1991.

"Arizona Stock Exchange: Skeptics are Forgiven," The Phoenix Gazette, p. B4, Apr. 1, 1996.

"At this Auction, you can Bid by Computer," Business Week—p. 90, Jan. 19, 1987.

"At Dead Line: AZX Alliance, Arizona Stock Exchange Discusses Possible Alliances with 6 Registered Broker–Dealer Groups, All Affiliated with an Electronic Communications Network or Operate as an ECN," Traders Magazine, Mar. 1, 1999.

"At Dead Line: Listed on AZX, Arizona Stock Exchange applies to trade listed stocks," Traders Magazine, Mar. 1, 1999.

"Attention Business Editors: Bank of Montreal Endorses Secure Credit Card Transactions on–line," Canada Newswire, Apr. 18, 1996.

*Aucnet Inc., Car Auctions By Satellite*, Asian Business, Nov. 1994, p. 16.

"Auction Block for Va. Lambs is a Computer," The Washington Post, p. v13, Mar. 23, 1989.

"Auctioning Unsold Airline Tickets," available at www.globalideasbank.org, printed on Sep. 28, 1999.

"Auctionnet Grows Rapidly in its First Year," *Crain Communications, Inc.*, Sep. 23, 1991.

"AT&T Develop 'paperless' Computerized Auction System for National Car Auctions," *M2 Presswire*, Mar. 13, 1997.

"Automated Auctions—4 –: GAO Questions Benefits of System," *Dow Jones News Service—Ticker*, Apr. 28, 1993.

"Banks Battle Credit Card Hackers," Canadian Press Newswire, May 31, 1996.

"Barbarians at the gate: Electronic Trading Systems are Proliferating South of the Border. Should Canadian Regulators open the door?," Canadian Investment Review, pp. 18–21, Sep. 1994.

"Beatrice Feeder–Pig Sales Beamed Up to Satellite," The Omaha World–Herald, p. 11, Aug. 29, 1994.

"Bid.Com's Overview," available from www.bid.com, printed Dec. 8, 1999.

"Black–box Global Trading a Challenge to Regulators," American Banker, vol. 157, No. 120, p . 5(1), Jun. 23, 1992.

"Bond Auction By Computer, Satisfied Major Traders," The Wall Street Journal, Jul. 18, 1990, p. C5.

"BOOKIT—Travel at At the Right Price," Airline Ticket Purchase Order for Business and Leisure Travel, 1991.

"Bookit Airfare Bidding System (Fax for your Plane ticket?)," Consumer Reports Travel Letter, vol. 7, No. 9, pp. 97, 106, Sep. 1991.

"Brief Transmission—Bank Comes Internet Credit Card Aware," TeleomWorldWire, Apr. 29, 1996.

"Building a Better Stock Market Using Call Auctions," Securities Industry News, Mar. 20, 2000 (9 pages).

"Buyside Sees Need to Upgrade Crossing Nets," Wall Street Letter, $60^{th}$ Annual Security Traders Assn. Convention: vol. XXV No. 43; p. 5, Nov. 1, 1993.

Canada's Internet Liquidators International Inc., Expands Online Auction with opening of U.S. Subsidiary In Tampa, Canada NewsWire, Jun. 26, 1996.
"Cathay Pacific Online Ticket Bidding," World Internet News Digest, May 8, 1996.
"Cathay Pacific Airways Auctions A Boeing 747–400 Worth of Seats In Third Cybertraveler Auction; "Bid Now, Fly Later" In Online Ticket Auction," Business Wire, Apr. 29, 1996.
"Cattlemen Tune In to Video Auctions," The Omaha World–Herald, p. 16b, Jun. 16, 1990.
"Changing Relationships," Chartered Banker, vol. 3, No. 10, pp. 14–18, Oct. 1997.
Computers & Automation Going, Going . . . Technology Is Making Antiques of Public Auctions Kathleen Doler, The Rhythmic Palaver of the Auctioneer. The Wink and Nod of the Skillful Bidder. For Good or Ill, These Scenes from the Public Real Estate Auction are Quickly Becoming Charming Relics of the Past., *Investor's Business Daily*, May 4, 1994.
"Computer Takes on Role of Auctioneer at Livestock Market," The Toronto Star, p. F7, Feb. 15, 1987.
"Computer Bidding At Auction Termed A Success: Upgrade Seen," *Dow Jones News Service*, Apr. 30, 1993.
*The Complete Guide to Securities Transactions, Enhancing Investment Performance and Controlling Costs*, ed. Wayne H. Wagner, pp. 27–30, 45–61, 63–77, 79–108, 161–169, 211–222, 279–290, and 359–372, 1989.
"The Computer Museum Brings Auction Block to Cyberspace in First Internet Auction," *Business Wire, Inc.*, Mar. 14, 1994.
"Dallas Gold & Silver Exchange, Inc. Announces Substantial Expansion of Internet Activities with Launch of Precious Metals Subscription Service," PR Newswire Association, Inc., Mar. 27, 1996.
"Debis Financial Services: Debis prepares to put UK auctions on–line," MS Presswire, Mar. 8, 1996.
"Delphi Moves HQ to New York, adds 750 jobs," Post–Newsweek Business Information, Inc. May 4, 1995.
"Do Satellites Dream of Electric Sheep?," Precision Marketing, p. 12, Jul. 10, 1995.
Econometrica–Journal of the Econometric Society, vol. 50, No. 5, pp. 1089–1122, Sep. 1982.
"Electronic Market, The chance to haggle by computer," Ciencia 1990 (2 pages).
"Executive Update How Auction Technology Sped and Enhanced Sale of Radio Licenses Ted Bunker Countless Budding Capitalists Cut Their Teeth Bargaining for Monopoly Properties or Betting Nickles and Dimes in After–School Stud Poker Games," Investor's Business Daily, p. A3, Feb. 24, 1995.
FCC Opens High–Tech Wireless Services Auction 10 Nationwide Licenses Offered; Bids Could Well Hit $50 Million, The Star–Ledger, Jul. 26, 1994.
"Firm goes Online with Auction," The Toronto Star, p. B2, Apr. 21, 1996.
"First–Ever Internet Auction Products Results for the Computer Museum," *Business Wire, Inc.*, Apr. 28, 1994.
"First Wine Auctioned Live In Cyperspace; Simultaneous Live And Cyber Wine Auction Benefits Charity," *Business Wire*, May 22, 1996.
"Fish Auctions Join Forces in Europe," Seaford International, Feb. 1, 1996, p. 8.
"Flowers are Staple of Dutch Auction," The Phoenix Gazette, p. E3, Aug. 17, 1990.

"Flowers shipped "around the clock" through Holland's Famous High–Tech Auction," Business Wire, Aug. 9, 1990.
Golden Age Antiques and Collectibles Online Auction, available at http://www.goldnage.com, printed on Nov. 10, 1997.
"The Heyday of the Auction, Finance and Economics," Economist, Jul. 24, 1999, available at www.economist.com, (6 pages).
"High Tech in the Cattle Market," The Omaha World–Herald, Feb. 11, 1985.
"IBM's Institute for Advanced Commerce Cyber Auctions Project Fact Sheet," IBM Institute for Advanced Commerce, Schedule of Events, Dec. 26, 1999.
Illiquid Securities Auction Oranizers See Wide Participation in Today's Kickoff, Institutional Investor, Inc., Bondweek, vol. x, No. 28, p. 8, Jul. 16, 1990.
"Individual Announces Revolutionary "Dutch Auction" System for Ads on NewsPage Web Service," Business Wire, Jul. 24, 1995.
"Instinet Corp. Accepts Offer from Reuters After it is Sweetened," Wall Street Journal, Nov. 11, 1986.
"INSTINET: Pushbutton Stock Trading Comes of Age," Information Week, p. 20–24, Nov. 2, 1987.
"The International Broker Rises," Banking World.
"ITG Links up with AZX Bridge," Wall Street Letter, vol. XXV, No. 39, p. 7, Sep. 27, 1993.
"Japan firm, Aucnet, to Supply GM Computer System to Auction Cars," *Japan Economic Journal*, p. 15, Jul. 19, 1986.
"KIIS & Unite III takes it to the Next Level with the World Wide Web Auction and a Special Appearance by Madonna," *Business Wire*, Jun. 27, 1995.
"Let's Do Wunsch; Electronic European Exchange in the Works," Wall Street Letter, p. 1, Jul. 13, 1992.
"Major Wall Street Firms Form New Electronic Trading Network," PR Newswire, Jun. 15, 1993.
*Market Making and the Changing Structure of the Securities Industry*, eds. Yakov Amihud et al., pp. 217–303, 1985.
"Mobile Phone Licenses on Sale Today High–Stakes Auction will use Computers to Determine Players for next Generation," Rocky Mountain Press, p. 39A, Dec. 5, 1994.
"New Wave of Communications Attracts High Bidding at Auction," The Fort Worth Star–Telegram, p. 2, Jul. 26, 1994.
"NYSAC says New Rule Will Make Its Auction More Flexible," Institutional Investor, Inc.,—Wall Street Letter, vol. XXI, No. 32, p. 8, Aug. 13, 1990.
"Online Commerce gets a Boost from Big Banks," Canadian Business and Current Affairs Marketing Magazine, vol. 101, No. 19, May 13, 1996, p. 4.
"ONSALE Brings Thrill of Auctions and Bargain Hunting Online; Unique Internet Retail Service Debuts with Week–Long Charity Auction for The Computer Museum in Boston," Business Wire, May 22, 1995.
"Open All Hours: Future Exchanges," The Economist, vol. 329, No. 7836, p. 107(1), Nov. 6, 1993.
*Oxford Study Examines Economics of Price and Quote Dissemination*, Securities Week, vol. 22, No. 23, p. 8, (Jun. 5, 1995).
The Over–The–Counter Market, The Equity Markets Today, pp. 47–97.
"Playing by National Rules," Global Securities.
"Preview Media and America Online Announce New Travel Service for America Online Subscribers," PR Newswire, Feb. 7, 1995.

"Private Flower Auction Opens in Netherlands," Agra Europe, Apr. 13, 1995.

"SEC Approves AZX's Request to Operate Morning Auction," Securities Week, vol. 23, No. 23, p. 1, Jun. 10, 1996.

"Slow but Steady Growth," Banking World.

"Some Dealers Shunned Electron Bidding At Year–Bill Sale," *Dow Jones News Service–Ticker*, Apr. 29, 1993.

"Superior Livestock Auction Unveils the Future of Marketing During Cattlemen's Meeting in Phoenix," Business Wire, Jan. 27, 1993.

"Technology Takes to Securities Trading," *IEEE Spectrum*, pp. 60–65, Feb. 1997.

"Teleres, Koll–Dove Team Up to Provide On–Line Auction Services," *Institutional Investor, Inc.,Real Estate Finance & Investment*, In the News, vol. 1, No. 44, p. 2, Nov. 13, 1995.

"Too Many Trading Places," *The Economist*, pp. 21–23, Jun. 19, 1993.

"Trading Systems, Stock Exchanges and Private firms provide the Information Vital to International Trading," Banking World, pp. 51–52, Mar. 1988.

"Treasury–Auction System –3–: GAO Report Chided Treasury, Fed.," *Dow Jones News Service—Ticker*, Jul. 8, 1993.

"Unusual Farmland Auction Set," 1995 IEEE Symposium on Security and Privacy, Oakland, California (May 8–10, 1995).

"Utopia Hosts First Live Auction on the Internet: Lavish 7,000 sq. ft. Mansion to be Subject of Historical Event," *Business Wire, Inc.*, Apr. 23, 1996.

"Video Auction Puts Hawaii Sites on Block," *The San Diego Union–Tribune*, p. F–54, Jul. 21, 1985.

"Welcome to the Iowa Electronic Markets!," Iowa Electronic Markets, available at www.biz.uiowa,edu/iem, printed on Jan., 23, 2000, (22 pages).

"West Coast Agents Reamin Skeptical About New Air Ticket Sales Plan; Marketel: Airline Ticket Sales System Sparks Concern," Travel Agent Magazine, p. 50, Sep. 9, 1991.

"Wine Auction On The Web," *Post–Newsweek Business Information, Inc.*, May 25, 1995.

"Wireless Networks: Auction Fever," The Economist, p. 79, Dec. 3, 1994.

A Historical Synopsis of Tradition Financial Services, available at http://www.tfsenergy.com/company.html.

Article, "Knight–Ridder Newspapers'. . . ," PR Newswire, Oct. 1, 1985.

Article, "Some Rare Bargains . . . ," PR Newswire, Mar. 20, 1984.

eSpeed, Inc. et al. v. Brokertec USA, L.L.C. et al., C.A. No. 03–612(KAJ), Answers and Objections to Plaintiffs' Second Set of Interrogatories.

eSpeed, Inc. et al. v. Brokertec USA, L.L.C. et al., C.A. No. 03–612, Complaint for Patent Infringement.

eSpeed, Inc. et al. v. Brokertec USA, L.L.C. et al., C.A. No. 03–612, Plaintiffs' Motion for Preliminary Injunction.

eSpeed, Inc. et al. v. Brokertec USA, L.L.C. et al., C.A. No. 03–612, Plaintiffs' Opening Brief in Support of Their Motion for Preliminary Injuction.

eSpeed, Inc. et al. v. Brokertec USA, L.L.C. et al., C.A. No. 03–612 Declaration of Howard W. Lutnick in Support of Motion for Preliminary Injunction.

eSpeed, Inc. et al. v. Brokertec USA, L.L.C. et al., C.A. No. 03–612 Declaration of Joseph C. Noviello in Support of Motion for Preliminary Injunction.

eSpeed, Inc. et al. v. Brokertec USA, L.L.C. et al., C.A. No. 03–612 Plaintiffs' Motion for Expedited Discovery.

eSpeed, Inc. et al. v. Brokertec USA, L.L.C. et al., C.A. No. 03–612 Plaintiffs' First Set of Expedited Interrogatories Addressed to All Defendants.

eSpeed, Inc. et al. v. Brokertec USA, L.L.C. et al., C.A. No. 03–612 Plaintiffs' First Expedited Requests for Production of Documents and Things Addressed to All Defendants.

eSpeed, Inc. et al. v. Brokertec USA, L.L.C. et al., C.A., No. 03–612 (KAJ) Defendant Brokertec USA, L.L.C.'S First Request for Production of Documents and Things.

eSpeed, Inc. et al. v. Brokertec USA, L.L.C. et al., C.A. No. 03–612 (KAJ) Defendant Brokertec USA, L.L.C.'s First Set of Interrogatories To Plaintiffs.

eSpeed, Inc. et al. v. Brokertec USA, L.L.C. et al., C.A. No. 03–612 (KAJ) Defendant Brokertec USA, L.L.C.'S First Set of Requests for Admissions.

eSpeed, Inc. et al. v. Brokertec USA, L.L.C. et al., C.A. No. 03–612 (KAJ) Responses and Objections to Plaintiffs' First Requests for Production of Documents.

eSpeed, Inc. et al. v. Brokertec USA, L.L.C. et al., C.A. No. 03–612 (KAJ) Answers and Objections to Plaintiffs' First Set of Interrogatories.

eSpeed, Inc. et al. v. Brokertec USA, L.L.C. et al., C.A. No. 03–612 (KAJ) Plaintiffs' First Set of Requests for Admissions Directed to Defendants Brokertec USA, L.L.C.; Garban, LLC; ICAP Plc; OM AB; and OM Technology (U.S.), Inc.

eSpeed, Inc. et al. v. Brokertec USA, L.L.C. et al., C.A. No. 03–612 (KAJ) Plaintiffs' Objections and Responses to Defendant Brokertec USA, L.L.C.'S First Set of Interrogatories.

eSpeed, Inc. et al. v. Brokertec USA, L.L.C. et al., C.A. No. 03–612 (KAJ) Plaintiffs' Responses and Objections to Defendant Brokertec USA, L.L.C.'S First Set of Requests for Admissions.

eSpeed, Inc. et al. v. Brokertec USA, L.L.C. et al., C.A. No. 03–612 (KAJ) Supplemental Answers and Objections to Plaintiffs' Second Set of Interrogatoreis.

eSpeed, Inc. et al. v. Brokertec USA, L.L.C. et al., C.A. No. 03–612 (KAJ) Supplemental Responses to Plaintiffs' First of Request for Admissions.

Paul, B., "Declaration of Bijoy Paul," Jan. 31, 2002.

Fraser, S.A., "Declaration of Stuart A. Fraser," Feb. 1, 2002.

Lutnick, H.W., "Declaration of Howard W. Lutnick," Feb. 5, 2002.

Anon., "Exhibits for Fraser and Paul Declarations," Exhibits A–P, various dates up to May 1995 (some updated).

eSpeed, Inc. et al., v. Brokertec USA L.L.C., et al., C.A. No. 03–612 (KAJ), Supplemental Opening Brief in Support of Motion by Plaintiffs eSpeed, Inc., Cantor Fitzgerald, L.P., and CFPH, L.L.C. for Preliminary Injuction.* eSpeed, Inc. et al., v. Brokertec USA L.L.C., et al., C.A. No. 03–612 (KAJ), Defendants' Proposed Findings of Fact and Conclusions of Law.*

Massimb, M.N. et al., "Electronic Trading, Market Structure and Liquidity," Financial Analysts Journal, vol. 50, No. 1, pp. 39–50, Jan.–Feb. 1994.

Charles Schwab & Co., Inc., "Charles Schwab Street Smart", *Charles Schwab Getting Started Manual*, 1994, pp. 1–29.

"EJV Aims to Launch Analytics Service By Year End," BondWeek, vol. 11, No. 38, p. 9, Sep. 23, 1991.

"EJV Snares Sanction for Autotrade System," BondWeek, vol. 11, No. 16, p. 13, Apr. 22, 1991.
Nicholas Brady, Richard Breeden, and Alan Greenspan, Joint Report on the Government Securities Market, Jan. 22, 1992.*
"CBJ–EJV Deal said to Please Feds," Bondweek, vol. XII, No. 12, Mar. 23, 1992 at 7.*
"CBOT's Absence Noted in Automated OTC Mart, but not Greatly," Bondweek, vol. X, No. 51, Dec. 24, 1990 at 7.*
"CBOT Eyes Screen–Based Repo, Basis Trading with EJV System," Bondweek, vol. XII, No. 22, Jun. 1, 1992 at 8.*
"CBOT Members Approve EJV Deal and First Boston to Offer Government Bond Trading System on Bloomberg," Bondweek, vol. XII, No. 38, Sep. 21, 1992 at 1, 8, and 11.*
"Chapdelaine Notches 38 Participants on Chats," Bondweek, vol. X, No. 26, Jul. 2, 1990 at 8.*
"Chapdelaine's Trading System Up and Running," Bondweek, vol. X, No. 14, Apr. 9, 1990 at 10.*
"Chats Advances at Chapdelaine," Bondweek, vol. X, No. 1, Jan. 8, 1990, at 7.*
"Chicago Board Brokerage User Manual," 27 pages.*
"Discontent Reported Among Some EJV Backers," Bondweek, vol. XII, No. 24, Jun. 15, 1992 at 11–12.*
"EJV Aims to Launch Analytics Service by Year End and Long Bond Added to EJV's Treasury Bond–Trading System," Bondweek, vol. XI, No. 38, Sep. 23, 1991 at 9.*
"EJV's Analytics Product is 6–9 Months from Market," Bondweek, vol. XI, No. 26, Jul. 1, 1991 at 10.*
"EJV Develops Windows–Based Software to Access F.I. Data," Bondweek, vol. XV, No. 46, Nov. 20, 1995 at 6.*
"EJV Fills Out Management Team," Bondweek, vol. X, No. 36, Sep. 10, 1990 at 11.*
"EVJ Pre–Selling Its Analytics Product," Bondweek, vol. XI, No. 50, Dec. 16, 1991 at 11.*
"EJV Says Its Trading System Will Recognize Voice Orders," Bondweek, vol. XI, No. 10, Mar. 11, 1991 at 9.*
"EJV Snares Sanction for Autotrade System," Bondweek, vol. XI, No. 16, Apr. 22, 1991 at 13.*
"EJV to go on Line in Three Months," Bondweek, vol. XI, No. 8, Feb. 25, 1991 at 2.*
"EJV to Pilot Its First Analytics System Next Month," Bondweek, vol. XI, No. 20, May 20, 1991 at 10.*
"Electronic Joint Venture Reportedly Chats with Thomson Financial," Bondweek, vol. X No. 10, Mar. 12, 1990 at 10.*
"Liberty in Talks to Join EJV," Bondweek, vol. XIII, No. 10, Mar. 15, 1993 at 2.*
"Liffe Plans £1.25 Million Upgrade of its After–Hours System," Bondweek, vol. XII, No. 46, Nov. 16, 1992 at 11.*
Memorandum from Bob McCausland to Larry Gomes, Oct. 16, 1990, pp. 2.*
Memorandum from Bob McCausland to Larry Gomes, Mar. 6, 1991, pp. 2.*
Memorandum from Bob McCausland to Larry Gomes, Apr. 3, 1991, pp. 2.*
Memorandum from Bob McCausland to Larry Gomes, Apr. 5, 1991, pp. 2.*
Memorandum from Bob McCausland to Larry Gomes, Apr. 12, 1991, p. 1*.
Memorandum from Bob McCausland to Mike Pires, Apr. 19, 1991, pp. 2.*
Memorandum from Bob McCausland to Larry Gomes, Apr. 22, 1991, p. 1.*
Memorandum from Bob McCausland to Mike Pires, Apr. 24, 1991, p. 1.*
Memorandum from Bob McCausland to Larry Gomes, May 30, 1991, p. 1.*
Memorandum from Bob McCausland to Larry Gomes, Jun. 12, 1991, p. 1.*
Memorandum from Bob McCausland to Larry Gomes, Jun. 13, 1991, p. 1.*
Memorandum from Bob McCausland to Larry Gomes, Jul. 15, 1991, pp. 3.*
Memorandum from Bob McCausland to Larry Gomes, Jul. 18, 1991, pp. 8.*
Memorandum from Bob McCausland to Larry Gomes, Feb. 5, 1992, pp. 17.*
"Merrill Mulls EJV Participation," Bondweek, vol. XII, No. 34, Aug. 24, 1992 at 1 and 11.*
"Some Bills Trading Gets Done on EJV's System," Bondweek, vol. XI, No. 22, Jun. 3, 1991 at 12.*
"Three Tech Managers Leave EJV . . . As Company Retools for Univu Rollout," Bondweek, vol. XII, No. 42, Oct. 19, 1992 at 8.*
"Trading Tech Secrets: A Chat with Dexter Senft of EJV Partners," Bondweek, vol. XII, No. 10, Mar. 9, 1992 at 8.*
"UNIVU: EJV Begins Filling in the Dots, Bondweek," vol. XII, No. 30, Jul. 27, 1992 at 10.*
"Univu Pilot is up at EJV's Partners, Plus One Non–Partner," Bondweek, vol. XI, No. 32, Aug. 12, 1991 at 8.*
"Voice Recognition Option Added to Chats," Bondweek, vol. X, No. 2, Jan. 15, 1990 at 4–5.*
Article, Bondweek, vol. XII, No. 20, May 18, 1992 at 8.*
Article, Bondweek, vol. XII, No. 40, Oct. 5, 1992 at 8.*
Article, Bondweek, vol. XIII, No. 5, Feb. 8, 1993 at 8.*
Advertisement in Bondweek, vol. XV, No. 4, Jan. 30, 1995, Starting Mar. 1, The Muni Bond Futures Contract will be an Even Better Trading Tool.*
Advertisement in Bondweek, vol. XVII, No. 8, Mar. 3, 1997, CBOT Yield Curve Spreads Because a Lot Can Happen in a Short Amount of Time.*
Advertisement in Bondweek, vol. XVII, No. 17, May 5, 1997, The T–Bond. And Now the Bond Open Outcry Trading in the World's Two Largest Bond Contracts at the CBOT.*

* cited by examiner

AUTOMATED PRICE IMPROVEMENT PROTOCOL PROCESSOR

CROSS REFERENCE TO RELATED APPLICATIONS

This is a continuation of U.S. patent application Ser. No. 09/216,464, filed Dec. 18, 1998, now U.S. Pat. No. 6,850,907, which is a continuation-in-part of U.S. patent application Ser. No. 08/766,733, filed Dec. 13, 1996, now U.S. Pat. No. 5,905,974, both of which are incorporated herein by reference.

BACKGROUND OF THE INVENTION

This invention relates to financial transaction data processing. More particularly, this invention relates to data processing systems and methods for managing the trading of select classes of assets including securities, financial instruments, commodities, and their derivatives in accordance with specific protocols in an auction format with controlled sequences of auction events.

Economic activity has at its centerpiece the buyer-seller transaction for goods and services produced and consumed in a market economy. It is the fundamental mechanism that allocates resources to producers and output to consumers. The operation of the buyer-seller mechanism is often a critical determinant of economic efficiency, and when operated properly, substantially enhances market performance.

Through history, many different approaches have been adopted to bring buyers and sellers together, each with the objective of having transactions occur at or very near the "market" price of goods, satisfying the desires of both buyers and sellers. By definition, the market price is the price that a fully educated market, given full access to that market, will transact select goods. Discovery of the market price can be accomplished by permitting full access to the transaction by substantially all potential buyers and sellers and allowing expression of each party's desires. However, the buyer-seller transaction should be structured to operate at very low costs—or it will distort the market price of goods with artificially high transaction costs. Thus, the two keys to effective buyer/seller transactions—full access coupled with low transaction costs—can be and often are conflicting, necessitating trade-offs between market knowledge and trading efficiency.

One well-known and particularly successful buyer-seller transaction system is known as the "open outcry auction." Buyers and sellers collect in one location and brokers present prices for select goods to the group via simple vocal offerings. While this approach has been used for almost all kinds of goods, it is particularly useful where there are no established trading locations or markets for the selected items. This approach is the dominant trading forum for exotic items such as rare pieces of art and the like. Although successful in bringing interested parties to the transaction, the overall process can be very expensive, adding significantly to market-distorting transaction costs.

Open outcry auction techniques, modified over time, have also found successful application in many trading activities, including the buying and selling of farm produce and livestock, commodities contracts, futures contracts on various items, and fixed income securities. Many of these trading activities focus on the buying and selling of essentially fungible items; that is, items without meaningful differences from like items on the market. For example, the price of a bushel of wheat for February delivery is usually independent of its source. Similarly, a 30-year U.S. treasury bond paying a coupon rate of 6.75% and having an August 1996 issue date is indistinguishable from an identical bond owned by another investor. Accordingly, the price at which buyers are willing to pay and sellers are willing to accept defines the market price of all 30-year U.S. treasury bonds of that same vintage, allowing open outcry auction trading without regard to an item's source.

(For clarity, the following description focuses mainly on fixed income securities, which should in no way be construed as limiting the scope or applicability of the invention.)

Fixed income securities issued by the United States government are known as U.S. treasuries. These instruments typically span maturities of 13 to 52 weeks (T-bills), one to ten years (notes), and up to 30 years (Bonds). T-Bills are pure discount securities having no coupons. Almost all other treasuries having longer terms are coupon notes or bonds, with defined semi-annual interest payments to the holder. An additional and more recent type of treasury security provides for inflation indexed payments.

New treasury securities are auctioned by the U.S. government at preestablished auction dates. The auction prices for newly issued treasuries having a face value with a set coupon rate defines the treasuries' yields when issued. After the auction, the treasuries enter the secondary market and are traded typically "over the counter" (i.e., without a defined exchange). As inflation expectations and supply and demand conditions change, the prices of recently auctioned treasuries fluctuate on the secondary market. The new prices reflect competing bid and offer prices communicated among institutions, banks, brokers, and dealers in the secondary market.

The newly auctioned securities are traded with securities that issued in earlier auctions. Some securities are traded more often than others and are called the "actives." The actives usually correspond to the recently issued securities as opposed to the older securities. Indeed, some older securities are infrequently traded, resulting in an illiquid market that may or may not reflect the market-determined interest rate for the more current securities having the same maturity as the older securities.

Accordingly, the very size and diversity of the treasury market requires a high level of sophistication by market participants involved in the bidding, offering, buying, and selling of these securities. The very complexity associated with the transaction and the scale of trading undertaken by banks, brokers, dealers, and institutional participants necessitates a rigidly structured approach to trading.

In the past, open outcry auction bond brokering served its customers well, providing efficient execution at nearly accurate market pricing. The open outcry auction as applied to bond trading was implemented by a broker working with a collection of customers to create and manage a market. Typically, customer representatives—for both buyers and sellers—would congregate at a common location (e.g., a single room) and communicate with each other to develop pricing and confirm transactions. This process involved representatives expressing various bid and offer prices for a fixed income security at select volumes (which are expressed in millions of dollar at given maturities). This expression took the form of a loud oral "cry" of a proposed bid or offer and the coordination with fellow representatives regarding the extraction of complimentary positions until a transaction match was made and a deal done. This "trade capture" process relied on after-the-fact reporting of what just transpired during the oral outcry trade.

Recently, the trade capture process was performed by clerks who input data into electronic input devices. A clerk would interpret the open outcry of many individual brokers simultaneously, who were verbally making known the trading instructions of their customers. The quality of the data capture was a function of the interpretive skill of the clerk and the volume and volatility of customer orders. A significant drawback of this type of auction data capture process is the difficulty in accurately discerning each trading instruction as verbalized in rapid succession during a quickly moving market.

Many permutations of this process are known. In general, because of the lower volumes of transactions occurring at the time of its development, and the lack of suitable alternatives, the open outcry auction process remained the dominant trading mechanism for decades. However successful, this process is not perfect. Indeed, in recent years, some of the problems in an open outcry auction forum have been amplified by the vastly increased level of trading now undertaken in the fixed income field. Generally, difficulties in the open outcry auction process can occur as a result of trader personalities. For example, a loud, highly vocal representative may in fact dominate trading and transaction flow—even though the representative may only represent a smaller and less critical collection of customers. Although such aggressive actions at an open outcry auction may be beneficial to those customers in the short run, overall, such trading dominance can and will likely distort pricing away from the actual market and leave some buyers and sellers unsatisfied.

Other problems exist in open outcry auctions that retard efficient trading. The speed at which trading flows and the oral nature of the auction process create a potential for human error that often translates into many millions of dollars committed to trades unrelated to customer objectives. On some occasions, the broker is left at the end of each trading day with a reconciliation process that may, under certain market conditions, wipe out all associated profit from that day's trading. Also, customers may quickly change trading direction based on new information available to the market. Shifting position or backing out of a previously committed transaction on very short notice is often very difficult in the traditional open outcry process.

There have been many efforts to incorporate computers into trading of select assets and financial instruments, including efforts to automate the auction process through systems that control auction protocols. Indeed, almost all trading today involves some computer support, from simple information delivery to sophisticated trading systems that automate transactions at select criteria. However, these systems have not significantly impacted the issues presented herein relating to satisfaction of buyers' and sellers' complex desires in completing transactions in open outcry auctions and traditional fixed income trading.

In view of the foregoing, it would be desirable to provide apparatus and methods that address the aforementioned problems of certain trading processes involving buyers and sellers.

SUMMARY OF THE INVENTION

It is an object of this invention to provide a data processing system that supports a high volume trading system.

It is also an object of this invention to provide a data processing method that supports a transaction enabling process for trading securities at accelerated levels with few errors and low costs.

It is further an object of this invention to provide a data processing system that supports a formalized trading protocol governing the control of trading on a bid/offer market.

It is still further an object of this invention to provide a system that in real time collects, displays, and distributes information on current securities market activity and that in real time processes this information to quantify the scope of order and trading activity of participants.

It is yet further an object of this invention to provide apparatus for the select processing of several types of data that are qualified prior to use and for translating the qualified data into order and trading states for fixed income securities.

It is another object of this invention to provide a data processing system that has controlled access to trading commands pursuant to pre-established interactive criteria, rather than traditional bidding, offering, and trading criteria.

It is also another object of this invention to provide a computer system that includes multiple workstations linked by high speed communication paths to rapidly distribute and exchange market data to participants.

It is further another object of this invention to provide a system that grants priorities and rewards to participants who create liquidity while insuring that participants' orders are satisfied in an orderly and equitable fashion.

It is still another object of this invention to encourage buyers and sellers to reveal their total buy and sell intentions through commencement of a trading action that improves price execution.

It is yet another object of this invention to quantify price improvement trading incentives of buyers and sellers and bidders and offerors.

It is another object of this invention to distribute price improvement trading incentives to buyers and sellers.

It is yet another object of this invention to provide a database system linked to a price improvement protocol processor for collecting, filtering, and distributing select market data in real time.

It is another object of this invention to provide a computer system having dedicated workstation input devices customized for trading by participants at workstations that can each be further customized to the particular trading patterns of a given participant.

It is still another object of this invention to provide customized trading tools particular to a given participant, such as price improvement orders, stop and limit orders, contingent orders, and flag warnings (e.g., that a particular trading limit, margin limit, trade initiation limit, or the like has been reached).

The above and other objects of the invention are provided by a computer-based, data processing system having program controlled logic for managing select trading. The data processing system employs a plurality of trading workstations linked to a server for coordinated data flow and processing. Communication is provided by a network, such as, for example, an Ethernet, token ring, token bus, or other hierarchical LAN and/or WAN configuration. The system preferably includes a dedicated keypad for input at each workstation that provides individually programmed keystroke commands; alternatively, other keyboards, keypads, or voice controlled electronic devices can be used with the system. Central processing logic dictates the available order, trading and allocation options, and screen displays for each workstation. As orders and transactions are entered, various protocols affect the allocation of bid-offer control, priority generation, exclusive trading time, and interactive trade management. As trades are completed, the system updates a linked database with newly entered transactional data.

In accordance with this invention, the controlling logic provides a sequence of trading states for each participant. The five states are:

1. Bid-Offer State
2. When State
3. Workup State
4. Second Look State
5. Workdown State As various transactions are entered, workstations operate in one of these five states. The workstation "state" determines the options available to the participant—and thus controls the flow of orders and trades in a cost-efficient and substantially error-free manner. While participants may bid, offer, and trade on differently configured workstations, the protocols are universal for all participants, thus precluding aggressive control of transactions without true capital commitment.

Note that although the invention is described herein in terms of a fixed-income financial-instruments auction that fairly and quickly transacts bid-offer trading while providing trading incentives, the invention is not limited to such fixed-income instruments.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
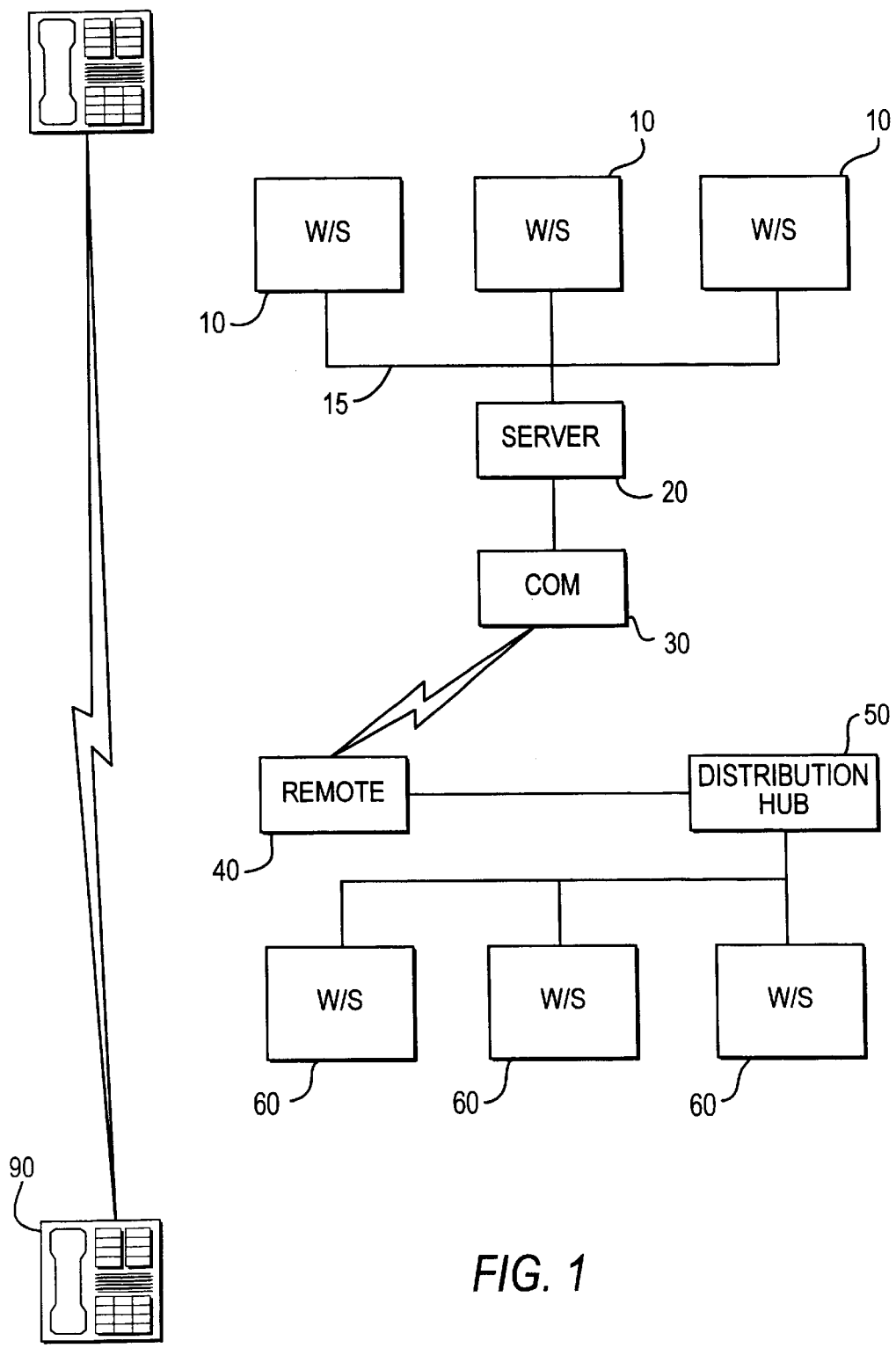
FIG. 1 is a system block diagram according to the invention.

The invention is directed to data processing systems and methods for implementing complex trading rules in support of select transactions. One aspect of the invention relates to a hardware arrangement that provides a specifically tailored platform for processor enhanced trading. This hardware arrangement encompasses a plurality of custom designed workstations linked together. Each workstation communicates to a central server that orchestrates the trading process in accordance with program controlled logic. The workstation includes a display for presenting the particulars of trading activity. Preferably, a customized keypad permits either enhanced data/trade entry by a participant or selection of an input interface by a participant.

Another aspect of the invention is the governing logic for controlling system dynamics. This logic is stored in system memory and provides the sequence of protocols and rules that allocate trading priority. The logic also provides system responses to operative commands entered by participants at the workstations either directly or via brokers or terminal operators. The system logic is important in two ways. First, it provides the guiding principles underlying the system, and thus, performance is tied directly thereto. Second, when system logic (known as the rules dictating market access and response) is understood by participants—it places participants on as close to an equal footing as possible. The system preferably provides all registered participants with fair and complete access to the trading process.

Although the examples herein focus on fixed income instruments and the trading of these instruments in large volumes—with the volume of a given transaction represented in, but not limited to, dollars (e.g., $25 million of 10 year treasuries)—the invention is not limited to them.

Each term listed below is used herein in accordance with its associated definition:

| | |
|---|---|
| Issue | A common class of fixed income security (e.g., the most recently issued 10-year treasury). |
| Bid | Dollar or yield amount at which to buy a security/Issue |
| Offer | Dollar or yield amount at which to sell a security/Issue |
| Spread | Difference between best Bid(s) and best Offer(s) |
| Size | The volume in dollars of a particular Bid/Offer |
| Hit | Accepting a pending Bid |
| Take or Lift | Accepting a pending Offer |
| Trade | A string of transactions at one or more prices initiated by a Hit or Take and continuing until timed out or done |
| Participant | A person or controlling entity receiving data on trading and responding thereto. While the Participant is often a Trader, terminal operator, or broker acting on behalf of a customer, this is not the only arrangement. For example, customers may directly interact as Participants. Other arrangements are also possible. |
| Makers | Participants with pending Bids and Offers (those who "make" a market) |
| Uncleared Entry | Current Bids/Offers that only a Maker can Hit or Take |
| Aggressor | A Participant who initiates a Trade |
| Traders | After a Trade is initiated, all Participants involved in the transaction (i.e., buyers and sellers) |
| Active Side | Group of Traders on the same side of the market as the Aggressor |
| Passive Side | Group of Traders on opposite side of the market from the Aggressor |
| Exclusive Time | A time period commenced by a trading action during which the first best bidder/offerer has the opportunity to trade more |

| | |
|---|---|
| Price Improvement Hit | An accepted sell order at and/or below the current best Bid to sell a security/Issue initially for more volume than shown on the Passive Side |
| Price Improvement Take | An accepted buy order at and/or above the current best Offer to buy a security/Issue initially for more volume than shown on the Passive Side |
| Trader Surplus | When an Aggressor has traded the entire size shown on the Passive Side at one or more price levels and is showing intent to trade more, or when a passive Participant is willing to buy or sell above or below the current trading price. These situations can lead to a Price Improvement Trade between Aggressors and passive Participants. |

System operation is based on the repetition of several functions, which in one embodiment of the invention are implemented through a specially designed keypad or other input means. Generally, the process begins when Participants enter Bids and Offers for a defined class of instruments. These orders are shown on a display screen in specific ways to reflect priority, size, and kind. A Participant can establish trading priority by placing a Bid or Offer at a select price and volume; Bids at the same price are displayed on the screen in the order in which they enter the system (i.e., time order); similarly, Offers at the same price are displayed on the screen in time order. As such, a "queue" of Bids and Offers develops with line placement for the same price set by time order. Alternatively, the queue can be set by a different metric, such as, for example, a combination of time and volume. The queue (or a summary thereof) is displayed at the Participant's workstation. Typically, there is a small difference between Bid and Offer prices (the "Spread"). If no difference exists, a "locked" market occurs.

Importantly, Bids and Offers are commitments—once placed, a Bid can be "Hit" and an Offer can be "Taken" or "Lifted" by a Participant willing to trade the instrument at the set price or set of prices.

To control trading between many Participants, a level of hierarchy is set. A Participant who Hits a Bid or Lifts an Offer is promoted to a new level known as the "Aggressor." By acting on a Bid or Offer, the Aggressor defines (and thus establishes) the Active Side of the Trade. For example, when a Participant hits a Bid, selling becomes the Active Side of the Trade and buying turns passive. However, when a Participant takes an Offer, buying is active. This can be important because according to some conventions, the Active Side pays commissions on the ensuing transactions. When a Price Improvement Trade takes place, however, the commission on this Trade can be divided among the Participants in the Trade. This allocation of commissions is premised on the notion that the active Participants are taking advantage of liquidity—while the Passive Side is supplying liquidity to the market, and on the notion that if a better price can be obtained during Price Improvement trading, a passive Trader is provided with value for which that Trader is willing to pay. Further combinations of commission allocation are preferable in order to encourage trading (e.g., choices among volume discounts, annual fixed fees, both sides paying, and paying based on time and place of execution).

For controlled implementation, the distinction between Active and Passive Sides is important and carries more significance in processing transactions than the Bid and Offer sides of a transaction.

Focusing further on the nomenclature for system logic, a "Trade" is considered a sequence of trading events, triggered by an initial Hit or Take that defines the Aggressor. A Trade continues for all such transactions until the Trade "clears." During a non-price improvement Trade, the Aggressor side remains active and all transactions take place at the price set by the initial Hit or Take—regardless of the number of transactions that follow. To properly track activity, a Trade generates a (virtual and/or real) single trade ticket—with an associated and screen-displayed reference number. When a transaction reflects more than a single buy/sell, several trade tickets each reflecting the total size transacted per Participant per side is recorded. A set of average price tickets or their equivalent may be generated.

In addition, the system preferably controls a Participant's maximum command size, thus preventing the Participant from entering orders that are outside the Participant's permissible trading parameters. The system preferably also protects the novice Participant. Accordingly, Participants with different skills can trade on a more level playing field. The system can preferably further control the hierarchy of Participants to allow management intervention.

FIG. 1 shows various hardware components of an embodiment of a system according to the invention. A plurality of workstations 10 are each individually linked to a central server 20 via network lines 15. Server 20 includes controlling software that manages data flow to individual workstations 10 in accordance with system constraints. The system can be linked to Participants at remote locations either directly, indirectly, and/or through the Internet. Access to trading activity is accomplished at communication server 30 and remote server 40, which is coupled to a remote distribution hub 50 and remote workstations 60. Supplemental communication lines are provided via conventional phone link 90. This platform further includes a 32-bit operating system that manages the multi-tasking environment within the network. The invention can be implemented using an open VMS64-bit operating system running on DEC Alpha clustered servers; however, other operating systems may be substituted. Alternatively, the desktop client machines can be implemented in OS/2 (Windows N/T 4.0 is a migration substitute). The workstation provides display and input and can be selected from Pentium® processor-based PCs, SPARC Stations® (using UNIX), or other hardware and software systems and/or languages providing the requisite functionality.

Figure 2:
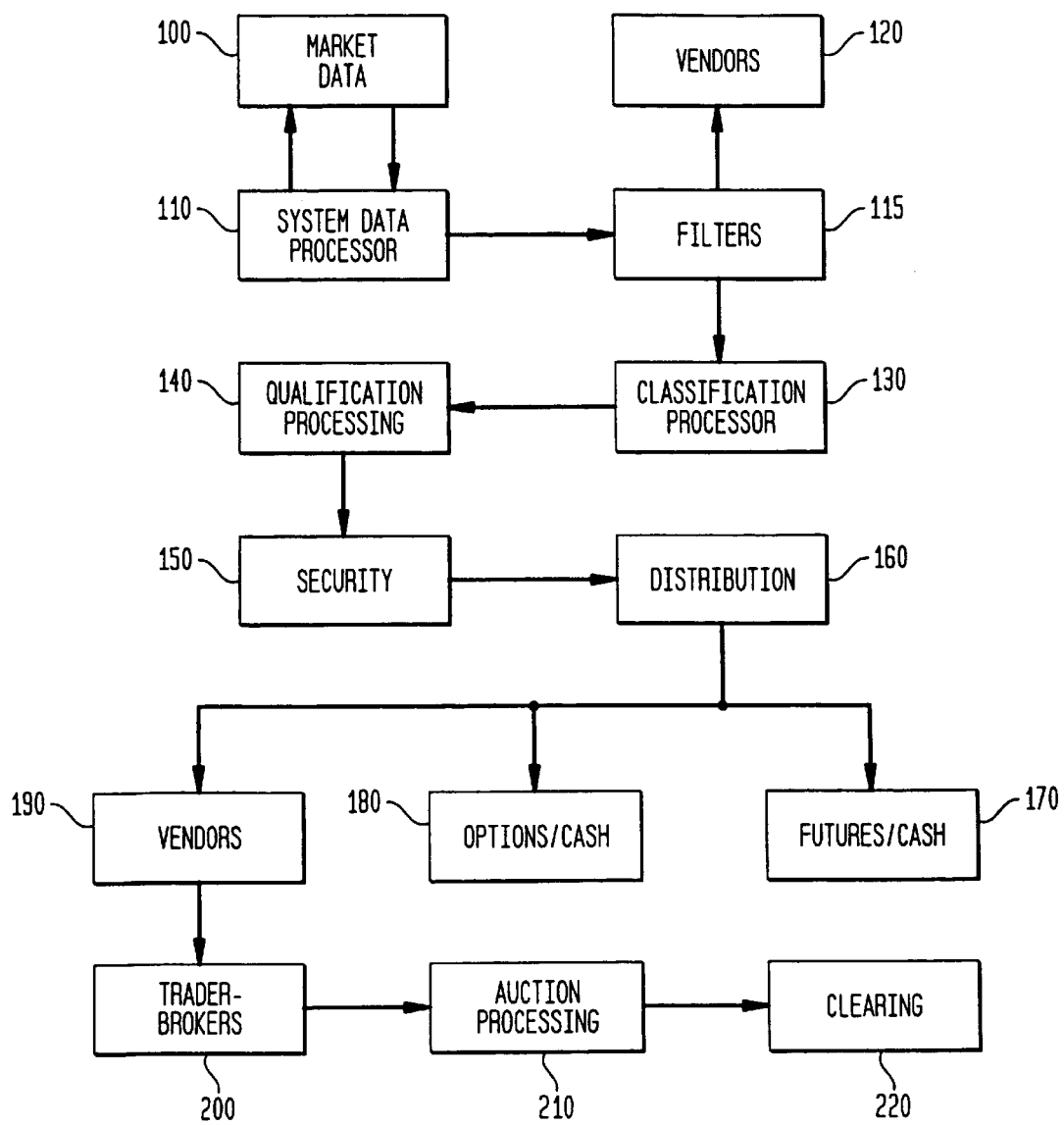
FIG. 2 is a diagram of trade-data transmission according to the invention.

FIG. 2 shows various information paths of the invention. Market information is derived from the auction process and is a highly valuable source of data to related markets, futures and options, or cash as the case may be. Market data 100 is collected from the plurality of online terminals operated by Participants within the relevant market sector. A continual exchange of information flows between Participants (included in market data 100) as Bids, Offers, and Trades are transacted in real time. This information is collected by the system proprietor and entered into a system data processor database 110.

Online market data is then transferred to a data filter and enhancer module 115, which clarifies and articulates the continuous incoming market data for use, e.g., by data accumulators and vendors 120. One aspect of the data enhancer operation is conversion of online trading information into digital form for transmission to a classification processor 130. Classification processor 130 creates a data set in an appropriate format for further manipulation, which includes generation of a coordination array of data in matrix format.

Once appropriately formatted, the online market data is then transmitted to a qualification processor 140 for determination of a real time command selection. The qualification processor also provides both Participant validation and credit limit approval with Participant and security type linkages among Participant relationships and security identifiers. The information is unloaded into a security database 150, and then passed to a distribution processor 160.

The foregoing operation results in real time distribution among Participant workstations via communication lines and screen displays for decision execution and for select distribution within the fixed income investment community. In one embodiment of the invention, three segments of this community are provided with the data. At options/cash 180 and futures/cash 170, system proprietors involved in automated options and futures processing are provided the cash market data for quantifying and evaluating specific options and futures positions pursuant to the trading of option and futures contracts on specifically identified securities, including indices and notional securities derived therefrom. In a similar manner, the securities data is provided to system proprietors regarding options and futures contracts to permit proper transactions in the trading of options and futures contracts based on the identified securities data.

In the present context, data relating to the auctioning of cash market securities is used to support trading in their derivative markets. Likewise, if the context were the auctioning of derivative securities, distribution flow would be to support trading in the underlying security.

The third channel of distribution for the securities is to data accumulators and vendors 190. This is followed by the continual distribution of securities data to Participants within the investment and trading community 200, to auction processing 210 in support of automated trading, and finally to clearing 220 in support of declaring and reporting functions associated with such trading, including clearance operators among others.

Trading activity is highly fluid and fast paced. Accordingly, efficient input systems enable Participants to quickly enter one of typically several trading choices available. Input systems can be enhanced by a highly specialized keypad that permits higher trading efficiency. Accordingly, another aspect of the invention are the unique keypads shown in FIGS. 3A–B.

During processing, various "states" exist depending on the type of inputs received by the system. The core Bid-Offer state reflects the open status of the market. In this state, Participants are referred to as "Makers" and "contra-makers;" during other states, Participants are considered "Traders" and "contra-traders." Traders and Makers are Participants who issue a trading command, while contra-makers and contra-traders are those who receive a trading command. Some Participants, e.g., a first buyer or first seller, in the Workup State are known as "current workers" and are vested with the authority under system logic to control a Trade for a predetermined amount of time. Depending on the fixed income security or instrument, this amount of time may be zero. Important character distinctions among Participants at various stages of trade processing are displayed on screen by reverse highlight or similar display attribute.

Figure 4:
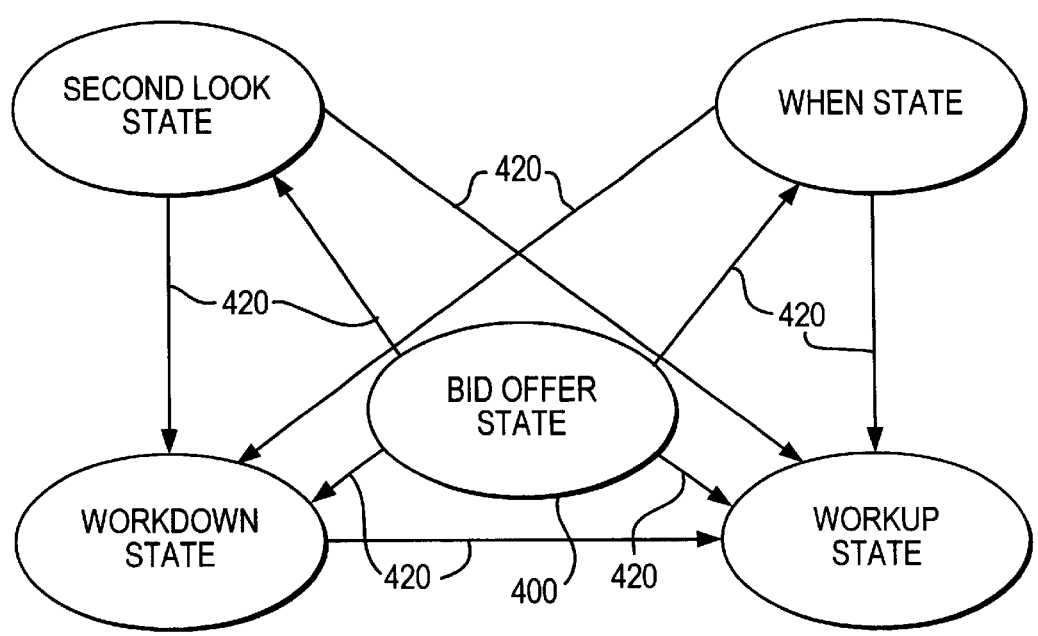
FIG. 4 is a diagram of various system states according to the invention.

The interrelationship of these five system states is shown in FIG. 4. Initial trading is always predicated on Bid-Offer State 400, with sequence process 420 assessing system inputs to determine state changes. As inputs are entered, a state change is triggered and processing shifts to paradigms associated with each of the five states. As each state is entered, the protocols are shifted and new trading rules apply.

Information about Participants and trading progress are provided at each workstation in the form of a selectively configured screen display. In particular, the system provides for screen display in the form of a trading quadrant or "quad" wherein key trading indicators are displayed. A sample QUAD is shown below:

| QUAD 1 | | | | | |
|---|---|---|---|---|---|
| 100.01 CUST | BID | 2 BOT | 100.03 CUST | OFFER | 15 SOLD |
| 2001 | 1 | 0 | 2007 | 5 | 0 |
| 2002 | 1 | 0 | 2006 | 10 | 0 |
| TOTAL | 2 | 0 | | 15 | 0 |

In QUAD 1, the current bid price is "100.01" (100 plus ¹⁄₃₂nd). Continuing across on the same line, the current Offer price is "100.03"—indicating a Spread of 0.02 (²⁄₃₂nds). When a Trade is in progress—as initiated by a Hit or Take from the Bid-Offer State, the Participant's attention is directed mainly to the conditional prompt showing the total size being bid or offered and that can be acted upon by the Participants. This number is displayed at the intersection of the TOTALs line and one of the Bid-Offer columns (i.e., the 2 or 15). This total is further defined in the quad into individual prequantities, indicating the Participant sizes in their respective rows (e.g., CUST 2006's size of 10). Other QUADS or arrangements can be under Participant or logic control to display trading state information.

Above the BOT and SOLD captions in QUAD 1, a second totals counter provides the Makers total size. In the Bid-Offer State, this total is the same as the conditional prompt because no Trades have been executed. This changes after the first transaction when a "Traders list" is created—and the conditional prompt tracks the Traders' total, while the Makers' total keeps track of quantity left in the Makers' list.

Figure 5:
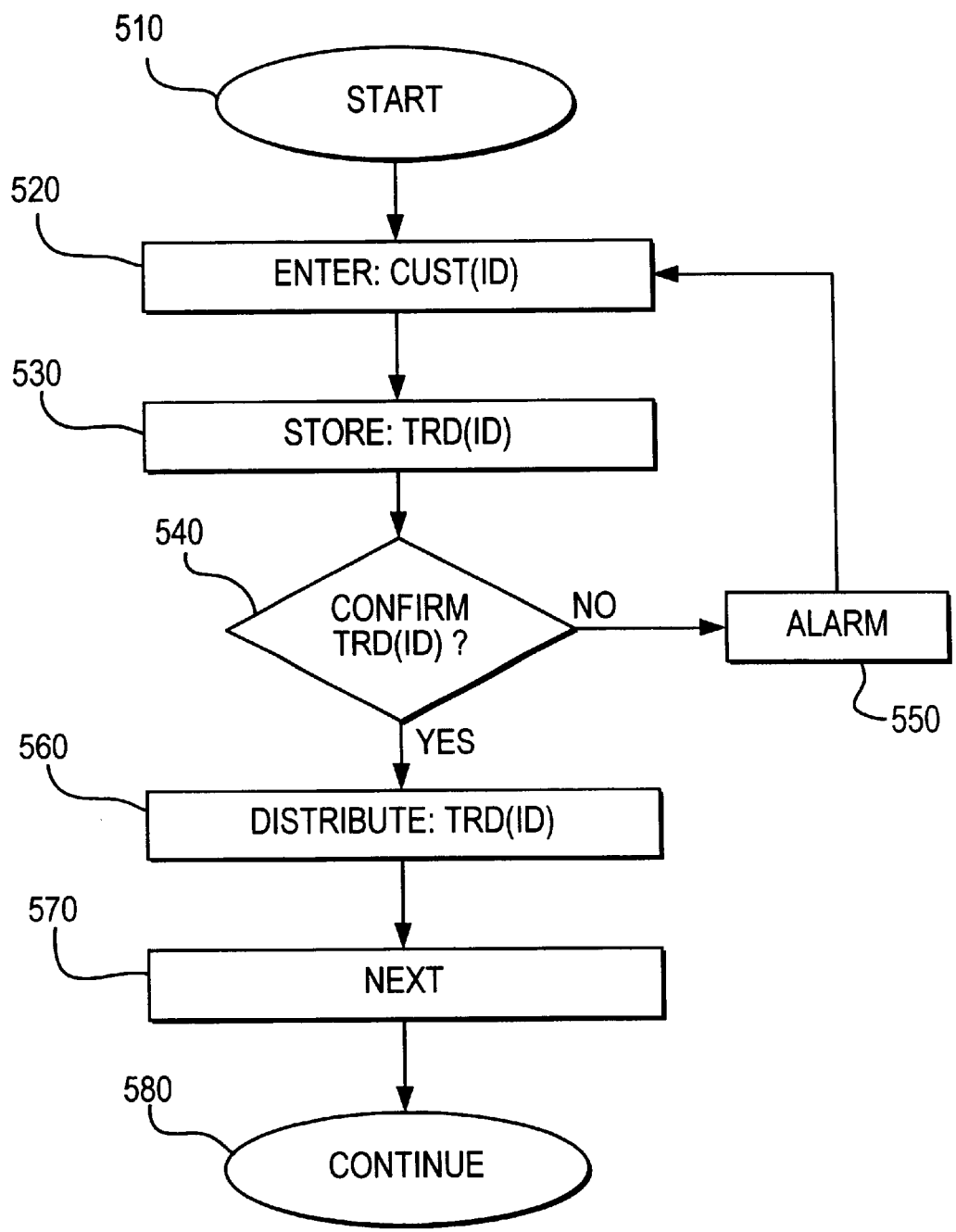
FIG. 5 is a logic diagram of trade-data input according to the invention.

Data selected for display on the QUAD is processed in accordance with logic shown in FIG. 5 according to the invention. The system enters a new Participant CUST(ID) (e.g., "2001") at 520 and stores this in memory with associated trade data/command TRD(ID) at 530. The trading command is confirmed at a system level, wherein system errors are rejected via alarm 550. Once confirmed, the new data/command TRD(ID) is distributed at 560 to screen buffers for display of the associated work status. This is repeated for each new entry at 570.

The following discussion now focuses on the Bid-Offer state, wherein market Makers are inputting various Bids and Offers into the system while waiting for an execution as the market matures. The best first bidders and offerors receive trading priorities during clearing and Exclusive Time. These pending commitments may be acted upon via Hit or Take commands by Makers currently showing or by a third party without showing its position prior to the Hit (or Take). As new Bids and Offers are made, the associated prices determine the placement in the queue, with equally priced Offers (or Bids) placed in time order. Accordingly, as the market tightens with better Bids and Offers (reducing the Spread), these new positions are moved to the top of the displayed queue.

In addition to price, Bids, and Offers, a size component is included, which is used to express the dollar volume of the pending Bid (or Offer). For a Participant to increase the size of the Bid or Offer, a new entry is made and placed in the queue separately, because the system preferably does not increment the size component—unless the entry was made adjacent in time to an existing Bid/Offer already in the queue. Alternatively, the sizes could be combined as follows: as Bids and Offers are entered during the Bid-Offer state, they are displayed in relation to their respective size, with the total Bid-Offer count (aggregate size) displayed at the noted conditional prompt. As such, the conditional prompt serves as the main impetus for a transaction because of its measure of apparent market capacity at a given price.

A Bid/Offer is typically (but not always) entered as "uncleared" during the Bid-Offer state—indicating that the Bid or Offer is only available to the first best market Participant (shown at the top of the first queue). Accordingly, uncleared presentations can be acted on by only this Participant for a system-set time interval—that is, only this Participant can Hit or Take these uncleared entries. After the preset time interval has run (tracked by a system internal clock), the uncleared Bids/Offers—if still extant—become available beyond the best price Participant. Also, for certain securities, the preset time interval may be zero. More often, a known interval is established. There is a business purpose for this arrangement. By giving Participants with active Bids/Offers the first chance for the new entry, these Participants are rewarded for showing the market on their side. Thus, the initial bidders/offerors are invited to become Aggressors—and the system preset interval provides these bidders/offerors with time to make their decision by preventing new buyers and sellers from entering the Trade (i.e., hitting or taking) for this discrete time interval.

Figure 6:
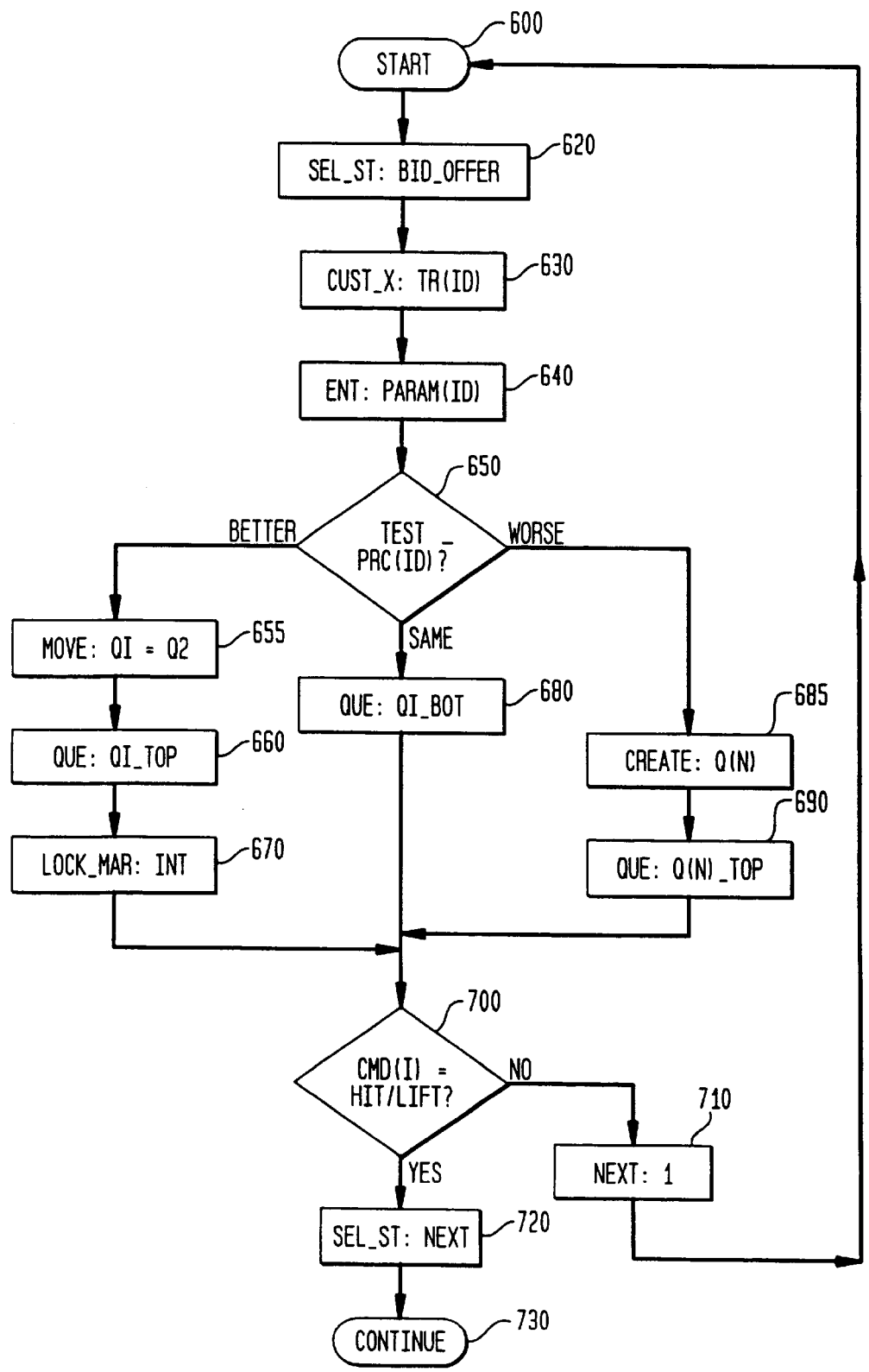
FIG. 6 is a logic diagram of a Bid-Offer State according to the invention.

System logic associated with the Bid-Offer state is shown in FIG. 6. Logic begins at 600 with a new data/command entry. A state selector qualifies the state as Bid-Offer at 620. At 630, a CUST X profile is taken from the new entry and all associated data is passed into a parameter string which is entered at 640.

The system compares the new price entry, PRC(I) entered into the system at test 650, with pending Bids (or Offers if PRC(I) is associated with an Offer). Test 650 results in one of three outcomes: first, if the new entry PRC(I) is better than the current market, logic branches to 655 and the previous top tier queue, Q1, is demoted (moved) to Q2. The new entry then forms the first line in the new top queue, Q1_TOP, at 660. This allows the system to create multiple queues at select price points for each side of the market. The multi-queue environment permits "Price Improvement" trading, described in detail below.

The second outcome of test 650 occurs if the new entry is out of the market (i.e., "worse" than the best current Bid/Offer). Logic then branches to 685 and a new queue, Q(N), is created. The new queue, having a price point worse than the market leaders, is displayed below the top queue. At 690, the new entry is placed at the top of the new queue, Q(N)_TOP.

As more entries are input, the system assesses each and places them in the multiple queues in accordance with price, and within each queue in accordance with time priority. This results in several price defined queues for each side of the market and allows for Price Improvement trading if and when a new Aggressor Takes/Hits all showing volume for one and up to all shown contra-queues.

The third outcome of test 650 is a qualified price, which leads to 680. This entry is placed at the bottom of Q1 because of time priority.

At test 700, the system checks for a new Hit/Take; if none, logic continues at 710 to the next entry. A positive response to test 700 shifts processing to the next state at 720.

The screen display changes according to the various entries into the bidding process. In QUAD 2 below, Participant CUSTs 3001–3003 on the BID side reflect a market of 27 million (see conditional prompt "27" on the TOTALs line). This includes a first bid by Participant CUST 3001 of 5.0 million, followed a little later by a second bid of 20 million. In this example, Participant CUST 3007 (e.g., a bank or other institutional Participant) enters the picture with an uncleared Offer of 10 million (the asterisk indicates the Offer is uncleared); this is the 10 million shown on the conditional prompt line on the Offer side. As such, controlling logic gives the original Makers the first chance at the new Offer by CUST 3007. After the preset interval, the market is again opened and the asterisk is removed.

| | | | QUAD 2 | | |
|---|---|---|---|---|---|
| >7.625.225 | | | TZ | | |
| 108.04 | 27 | | *108.04 | 10 | |
| CUST | BID | BOT | CUST | OFFER | SOLD |
| 3001 | 5 | 0 | 3007 | 10 | 0 |
| 3002 | 1 | 0 | | | |
| 3003 | 1 | 0 | | | |
| 3001 | 20 | 0 | | | |
| TOTAL | 27 | 0 | | 10 | 0 |

The When State is triggered by a trading command against an uncleared Bid/Offer by an Aggressor who is not the first best original Maker. However, system control does not allow this trading command by the new Aggressor to be instantaneously executed. In accordance with system logic, the trading processor creates a time interval or delay, and thus provides the first best original Maker with time to assess the new situation created by the Aggressor and then respond, if desired, to the uncleared entry on the Passive Side.

In particular, as noted above, the uncleared status exists for a defined interval—controlled by a computer driven timer. Only during this time interval does a When State occur, which then only lasts until resolved either by action on the part of the first best original Maker on the Active Side or by expiration of the interval timer.

During When State processing, the system displays the original Makers—existing with Bid/Offers outstanding prior to the entry of the new Aggressor—and the new Traders, who enter via Hit or Take commands on the pending uncleared Bid/Offer. These Makers and Traders are clearly separated on the screen (see QUAD 3B below). Importantly, these original Makers are given the opportunity to trade at the new price point established by the Aggressor; multiple Makers from the original list will each have an opportunity to take the new price in the order of their priority in the queue. The system increments through each Maker. If one issues a buy/sell order at their size, they become the Aggressor. When this occurs, the logic departs the When State and can either enter the Workup State or Workdown State depending on whether the new Aggressor takes the entire volume indicated at the conditional prompt.

Once When State processing has been initiated, no trade entries from the Passive Side are permitted. Furthermore, Participants are blocked from entering on the Active Side. Specifically, entries on the uncleared (active) side will come from new Traders, extant Traders, or the original Makers. If, for example, a Trader has 10 offered and 5 are traded, the Trader preferably can cancel the amount which is not yet committed during the When State.

However, if the second interval timer expires without any intercession by the original Makers, the When entries (one or several) will automatically trade—and the original Makers will not take part in this Trade. During the time-controlled interval, WTAK flashes on screen to the Makers showing a Trade on the uncleared Offer. WHIT will flash for a Hit on an uncleared Bid. During this interval, the size entries for pending Makers are all initialized to zero and are no longer presented at the conditional prompt.

Figure 7:
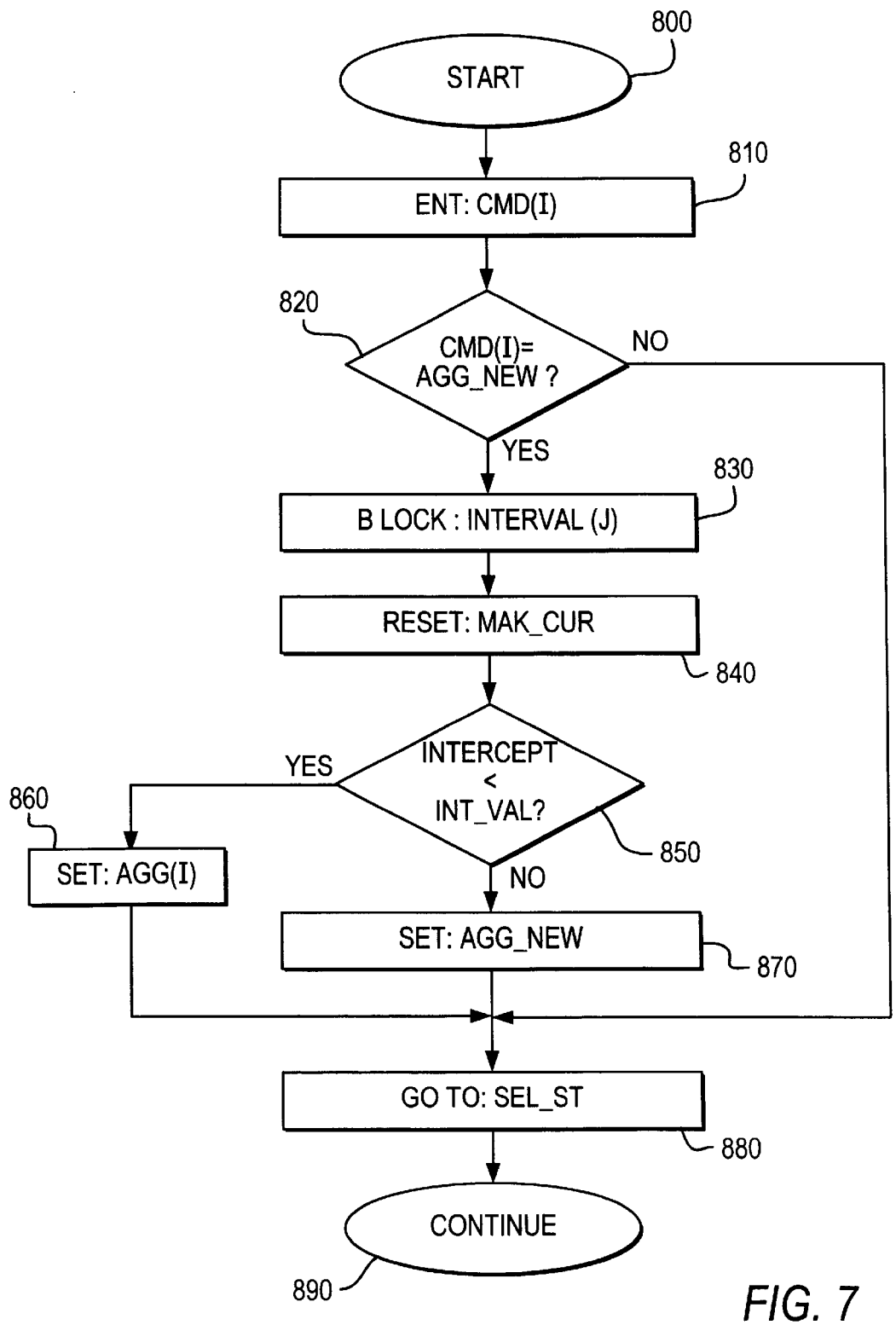
FIG. 7 is a logic diagram of a When State according to the invention.

When State processing is shown in FIG. 7 and is triggered by an entered trading command CMD(I) 810. Test 820 confirms whether the new trading command (Hit or Lift) is from a new Aggressor; if not, logic continues to 880 and then to either the Workup or Workdown State.

When the new trading command is from a new Aggressor, logic branches from test 820 to 830, where the market is blocked for a preset time interval. At 840, all current Active Side Makers are reset to zero. At test 850, the system determines whether these Makers intercept the Aggressor before the time interval expires. If yes, the intercepting maker becomes the Aggressor at 860, with full control over the succeeding trade sequence. If not, the new Aggressor is set at 870, and logic continues to the next State at 880.

Referring to QUADs 3A and 3B below, the following sequence illustrates the foregoing system logic. In QUAD 3A, the Bid-Offer State has two Participants, CUSTs 3002 and 3003 each showing bids at 10 million. Participant CUST 3007 has just placed an uncleared Offer for 1 million. Participant CUST 3001 would like to take the new Offer by Participant CUST 3007—but cannot do so automatically. In QUAD 3B, Participant CUST 3001 attempts to take the Offer by Participant CUST 3007, forcing the system into the When State and creating an uncleared list for the Active Side (i.e., Bid). However, the prequantity of the first two bidders is reduced to zero—because the system logic prevents these bids from being enforced at the new price point (108.04+). In this example, the second interval timer provides both original Makers CUST 3002 and CUST 3003 priority over Participant CUST 3001, with CUST 3002 retaining overall priority via placement in the queue.

| QUAD 3A | | | | | |
|---|---|---|---|---|---|
| >7.625.225 108.04 CUST | 20 BID | TZ BOT | *108.04+ CUST | OFFER | 1 SOLD |
| 3002 | 10 | 0 | 3007 | 1 | 0 |
| 3003 | 10 | 0 | | | |
| TOTAL | 20 | 0 | | 1 | 0 |

| QUAD 3B | | | | | |
|---|---|---|---|---|---|
| >7.625.225 108.04 CUST | 20 BID | TZ BOT | 108.04+ CUST | WTAK OFFER | 1 SOLD |
| 3002 | 0 | 0 | 3007 | 1 | 0 |
| 3003 | 0 | 0 | | | |
| 3001 | 1 | 0 | | | |
| TOTAL | 1 | 0 | | 1 | 0 |

Transactions forming a Trade take place in accordance with the invention during one of two trading states, known as the Workup and Workdown States. The Workup State occurs pursuant to Hits or Lifts by an Aggressor taking the entire volume shown on the Passive Side. Once established, the Workup State gives exclusive rights to the Trade to the initial Traders—who the system recognizes as the current workers. On screen, current workers are highlighted in a defined manner known to other Participants. Current workers control the Trade and can submit additional transaction volume to their contra-traders; this is to the exclusion of outside Participants. Current workers on the Active Side of the Trade will include the Aggressor, and possibly other Traders below the Aggressor with transactions that move the Trade into the "Workup" State by filling residual volume that needs "Workdown." For the Passive Side, an Aggressor that takes the entire size limits current worker status to himself and his counterparty.

The status of current worker dissipates upon entry of "done" by a Participant or the lapse of the trading inactivity interval. Again, this interval is a preset system parameter triggered via system logic. Absent such termination, current workers can trade almost indefinitely, as long as they continue to respond to their contra-party's size offerings.

Figure 8:
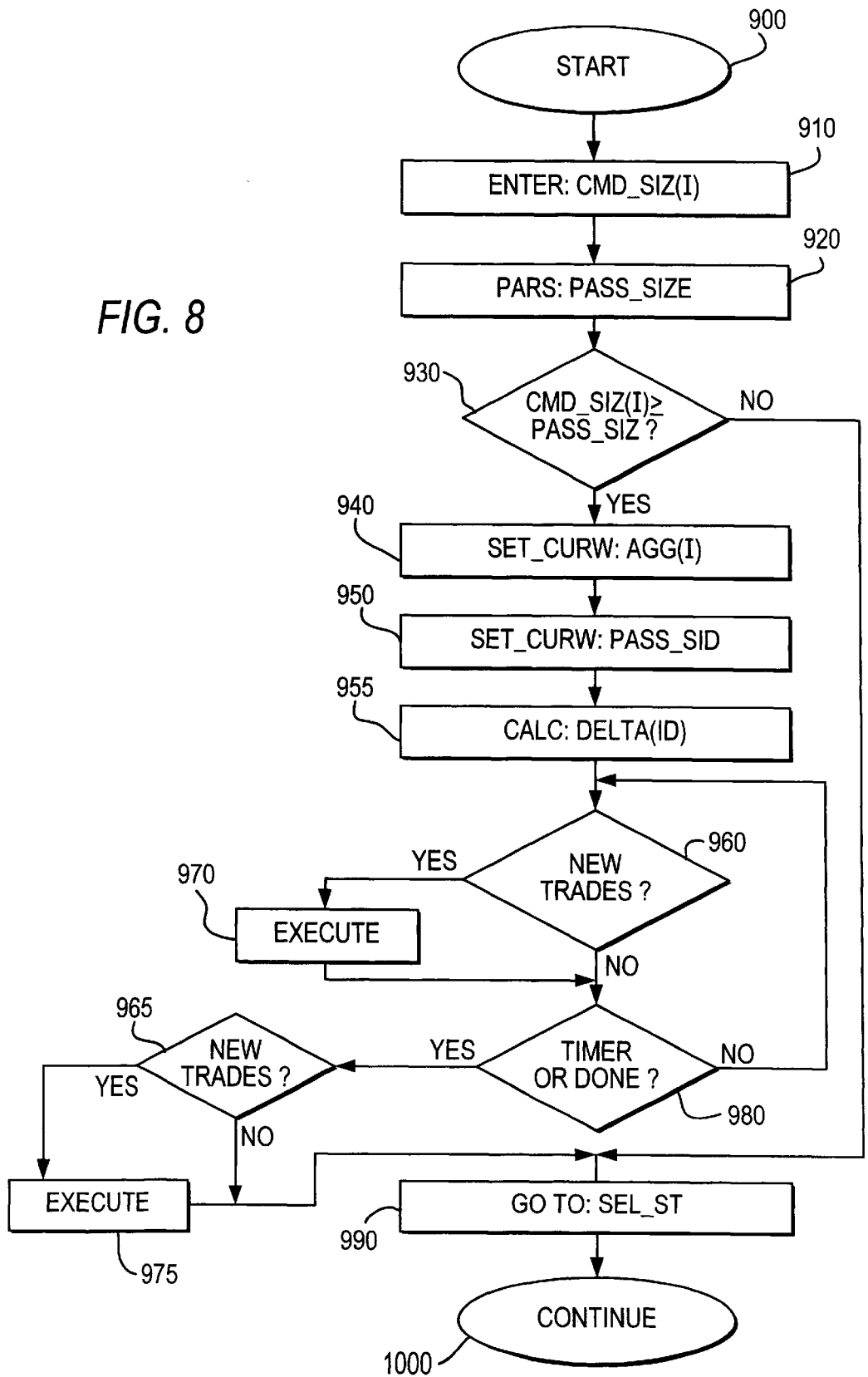
FIG. 8 is a logic diagram of a Workup State according to the invention.
Figure 9:
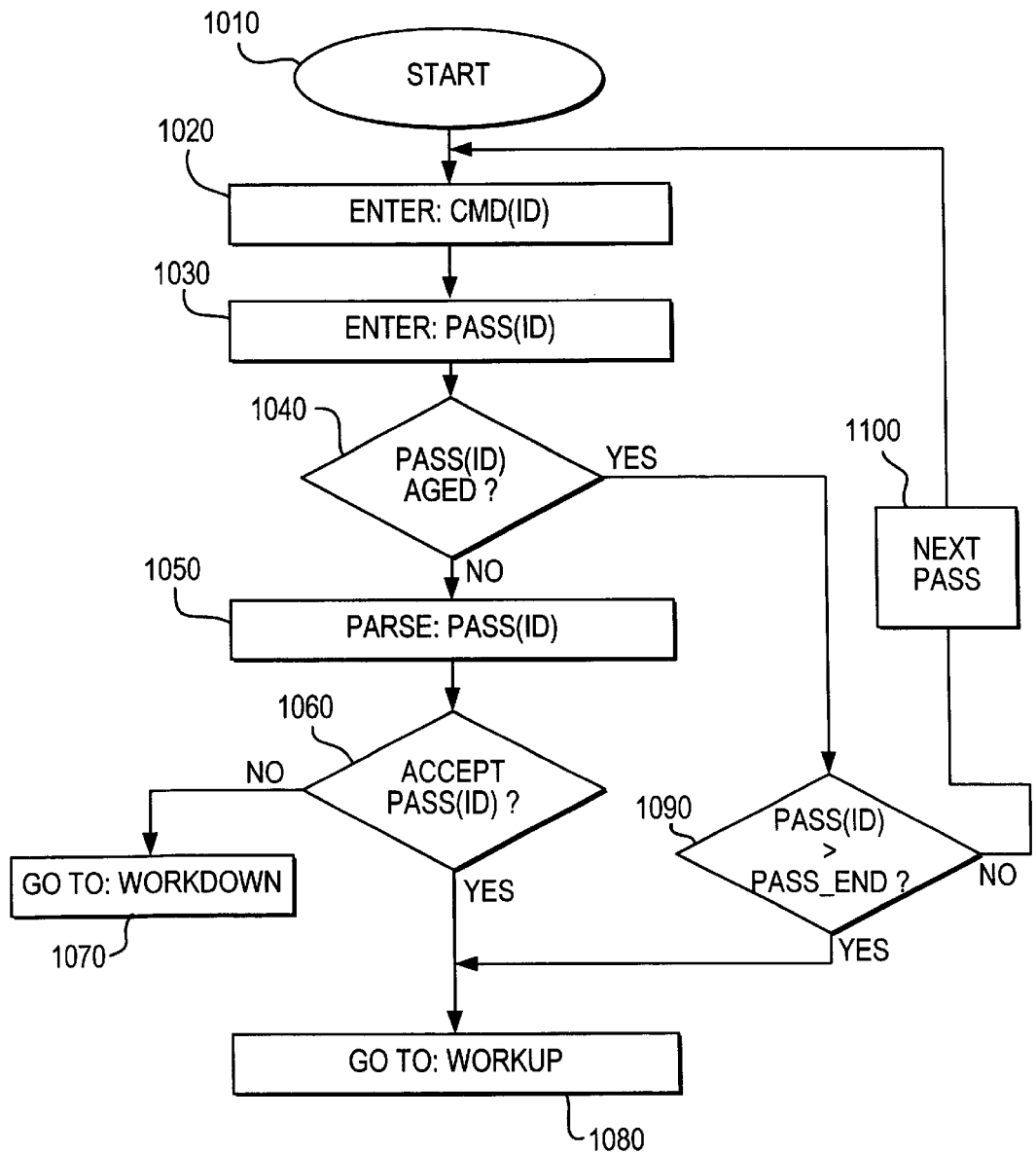
FIG. 9 is a logic diagram of a Second Look State according to the invention.

Workup State logic is shown in FIG. 8 and is tied to size and new order data. The Aggressor size is entered at 910 and the size of the Passive Side is determined at 920 prior to trade entry. At test 930, the system determines whether the Aggressor has taken the entire market offering at the time of the Trade; if not, logic continues to "select state" 990 and ultimately to the Workdown State (FIG. 9).

If the Aggressor has taken the entire market offering, test 930 passes logic to 940 and 950, where the current workers are assigned and new Trades are entered by those current workers to the exclusion of other Participants. Under these conditions, and if more than one price queue exists on the Passive Side, the system provides for Price Improvement trading. That is, the Aggressor has taken Trades at multiple price points, indicating a willingness to trade at prices worse than the best Offers/Bids. The system measures the Spread between the best and worst price shown for each contra-trader. A mathematically determined value is set at 955 bridging the two price points (e.g., the average of the two prices), with the new price difference variable, Delta (ID), set for that Trader. Given this new price point (a "Price Improvement" from both parties' viewpoint), new Trades may be entered at test 960 and executed at 970. This continues until the current workers are done or the preset interval expires as determined at test 980. The system then tests (at 965) and executes (at 975) any new transactions entered (via Hit or Take commands) by new Participants.

The above logic may be better understood with examples. A system without the Price Improvement feature is shown in QUAD 4A below, with a typical opening Bid-Offer displayed.

| QUAD 4A | | | | | |
|---|---|---|---|---|---|
| >7.625.225 | | | | | |
| 108.04 | 16 | TZ | 108.05+ | | 45 |
| CUST | BID | BOT | CUST | OFFER | SOLD |
| 3001 | 5 | 0 | 3007 | 25 | 0 |
| 3002 | 5 | 0 | 3006 | 10 | 0 |
| 3003 | 1 | 0 | 3005 | 10 | 0 |
| 3001 | 5 | 0 | | | |
| TOTAL | 16 | 0 | | 45 | 0 |

Assume that the Bid is Hit by Participant CUST 3005 selling the entire size (16 million) to the Passive Side. This results in Participant CUST 3005 (as the Aggressor) and the contra-trader (Participant CUST 3001) as the current workers. The Workup State now exists as the Aggressor has taken all of the initial size from the Passive Side. Those with priority, the Aggressor and first best bidder, are highlighted by a video attribute (shown in QUAD 4B as, for example, rectangular boxes).

| QUAD 4B | | | | | |
|---|---|---|---|---|---|
| >7.625.225 | | TZ | Refno 68119 | | |
| 108.04 | Hit | 16 | 108.05+ | | 36 |
| CUST | BUY | BOT | CUST | SELL | SOLD |
| 3001 | 0 | 10 | 3005 | 0 | 16 |
| 3002 | 0 | 5 | | | |
| 3003 | 0 | 1 | | | |
| TOTAL | 0 | 16 | | 0 | 16 |

Participant CUST 3002, wishing to continue, adds an additional 5 million size (adding to Participant CUST 3002's original 5 million), which is displayed as 5 under BUY and 5 under BOT (see QUAD 4C). A new Participant CUST 3004 now enters a sell order (Hit) for 50 million.

| QUAD 4C | | | | | |
|---|---|---|---|---|---|
| >7.625.225 | TZ | | Refno 68119 | | |
| 108.04 | Hit | 16 | 108.05+ | | 36 |
| CUST | BUY | BOT | CUST | SELL | SOLD |
| 3001 | 0 | 10 | 3005 | 0 | 16 |
| 3002 | 5 | 5 | 3004 | 50 | 0 |
| 3003 | 0 | 1 | | | |
| TOTAL | 5 | 16 | | 50 | 16 |

New Participant CUST 3004 waits until the current workers are done (via keyboard entry or timer controlled system interval). After this, the system executes for Participant CUST 3004 the sale of the additional 5 million to Participant CUST 3002, leaving 45 million remaining to be sold.

QUAD 4D shows the display after Participant CUST 3004 has traded with Participant CUST 3002. The asterisks next to the entries for CUSTs 3001 and 3005 indicate that these initial Traders are done or have timed-out. As shown in QUAD 4D, no one can control the Trade to the exclusion of others because there is no longer a current worker.

| QUAD 4D | | | | | |
|---|---|---|---|---|---|
| >7.625.225 | | TZ | Refno 68119 | | |
| 108.04 | Hit | 21 | 108.05+ | | 36 |
| CUST | BUY | BOT | CUST | SELL | SOLD |
| *3001 | 0 | 10 | *3005 | 0 | 16 |
| 3003 | 0 | 1 | 3004 | 45 | 5 |
| 3002 | 0 | 10 | | | |
| TOTAL | 0 | 21 | | 45 | 21 |

Market moves by Participants are often fast paced and can occasionally result in almost simultaneous position changes. For example, a first Participant can hit a second Participant's bid of a particular size via the "buy/sell all" key an instant after the second Participant significantly increases the bid size (e.g., from 5 to 20 million). The Aggressor has now inadvertently taken much more than planned.

System logic addresses this problem by creating a supplemental state, known as "Second Look" State. When the size of the Passive Side increases just prior to a Hit or Lift command, the system distinguishes the very recent increase in volume from earlier entries via an "age" timer (i.e., a system interval). The age timer tracks the pendency of all Bids and Offers and creates a Second Look State whenever a Hit/Lift (via a buy/sell all key) command entry occurs while a Bid/Offer is less than, for example, two seconds old.

The Second Look State, however, is limited. The Aggressor completes the transaction excluding the new "unaged" Bid/Offer. This new size is left untraded and others may add more Bids/Offers on it, the Passive Side, but these Bids/Offers stay "below the line." Even though the Aggressor did not fill the entire size displayed, the Aggressor assumes current worker status and has the right to:

1. take the new size, entering the Workup State with the contra-trader;
2. refuse the new size (via the "done" command), sending the Trade into the Workdown State; and
3. Take/Hit a "partial" amount and then lose priority, causing the system to enter the Workdown State.

Second Look State logic is shown in FIG. 9, where trading commands are entered time-stamped at 1020 and extant passive Maker entries are entered at 1030. Test 1040 determines whether the Passive Side entries, PASS(ID), are "aged" (i.e., not just recently entered). If they are aged, logic branches to test 1090 to determine whether PASS(ID) is the last entry, PASS_END. If not, a pass counter is incremented at 1100 and logic returns to sequence start 1010.

If the Passive Side entries are not aged, test 1040 shifts logic to 1050 where the new entry is parsed; the Aggressor is then given the opportunity to take the new additional size within the Trade at test 1060. The system maintains the commitment of the Aggressor to the original size of the Take or Hit. If accepted, logic branches at 1080 to the Workup State. If not accepted, logic branches at 1070 to the Workdown State.

These principles of the invention are illustrated in the following sequence of screen displays shown in QUADs 5A–C below. Participant CUSTs 3001, 3002, and 3003 show 5 million, 1 million, and 1 million, respectively, as havin been bought. Just prior to the sell order by Participant CUST 3007 (via, e.g., a "HIT ALL" key), CUST 3004 enters with a 1 million size. All size transacts, except this late 1 million because it has not "aged" sufficiently as measured by the system interval timer. This amount remains untraded, and the system enters the Second Look State.

| QUAD 5A | | | | | |
|---|---|---|---|---|---|
| >7.625.225 | | TZ | | | |
| 108.04 | Hit | 7 | | Refno 68119 | |
| CUST | BUY | BOT | CUST | SELL | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| TOTAL | 1 | 7 | | 0 | 7 |

If Participant CUST 3007 decides to fill this outstanding 1 million size, the state moves out of Second Look and into the Workup State with CUST 3007 and CUST 3001 as current workers. As shown QUAD 5B, CUST 3007 has also entered a sell order for a volume of 2 million. The priority box blinks or is highlighted in some way to indicate that the Aggressor is in the Second Look State.

| QUAD 5B | | | | | |
|---|---|---|---|---|---|
| >7.625.225 | | TZ | | Refno 68119 | |
| 108.04 | Hit | 8 | | | 0 |
| CUST | BUY | BOT | CUST | SELL | SOLD |
| 3001 | 0 | 5 | 3007 | 2 | 8 |
| 3002 | 0 | 1 | | | |
| 3003 | 0 | 1 | | | |
| 3004 | 0 | 1 | | | |
| TOTAL | 0 | 8 | | 2 | 8 |

If, however, CUST 3007 passes, the Trade goes to the Workdown State (see QUAD 5C). New Participant CUST 3005 now enters and is positioned below the line and can only trade after CUST 3001 is done and CUST 3004 trades.

| QUAD 5C | | | | | |
|---|---|---|---|---|---|
| >7.625.225 | | TZ | | Refno 68119 | |
| 108.04 | Hit | 7 | | | 0 |
| CUST | BUY | BOT | CUST | SELL | SOLD |
| 3001 | 0 | 5 | 3007 | 0 | 7 |
| 3002 | 0 | 1 | | | |
| 3003 | 0 | 1 | | | |
| 3004 | 1 | 0 | | | |
| 3005 | 1 | 0 | | | |
| TOTAL | 1 | 7 | | 0 | 7 |

Another state for trading logic is the Workdown State. It occurs when the original Aggressor takes less than all of the size showing on the Passive Side. The remaining size must be "worked down" to complete the Trade. This rewards those Participants that show Bids/Offers (i.e., their intent to buy/sell), thus providing liquidity to the market. If the original Aggressor returns for the remaining size from the Passive Side, the Workup State is initiated. Another Trader from the Active Side may work down the remaining Passive Side quantity, putting the Trade in the Workup State—with this new Trader as the current worker—which includes obtaining Exclusive Time if all the remaining size from the original Bid-Offer State is taken.

Figure 10:
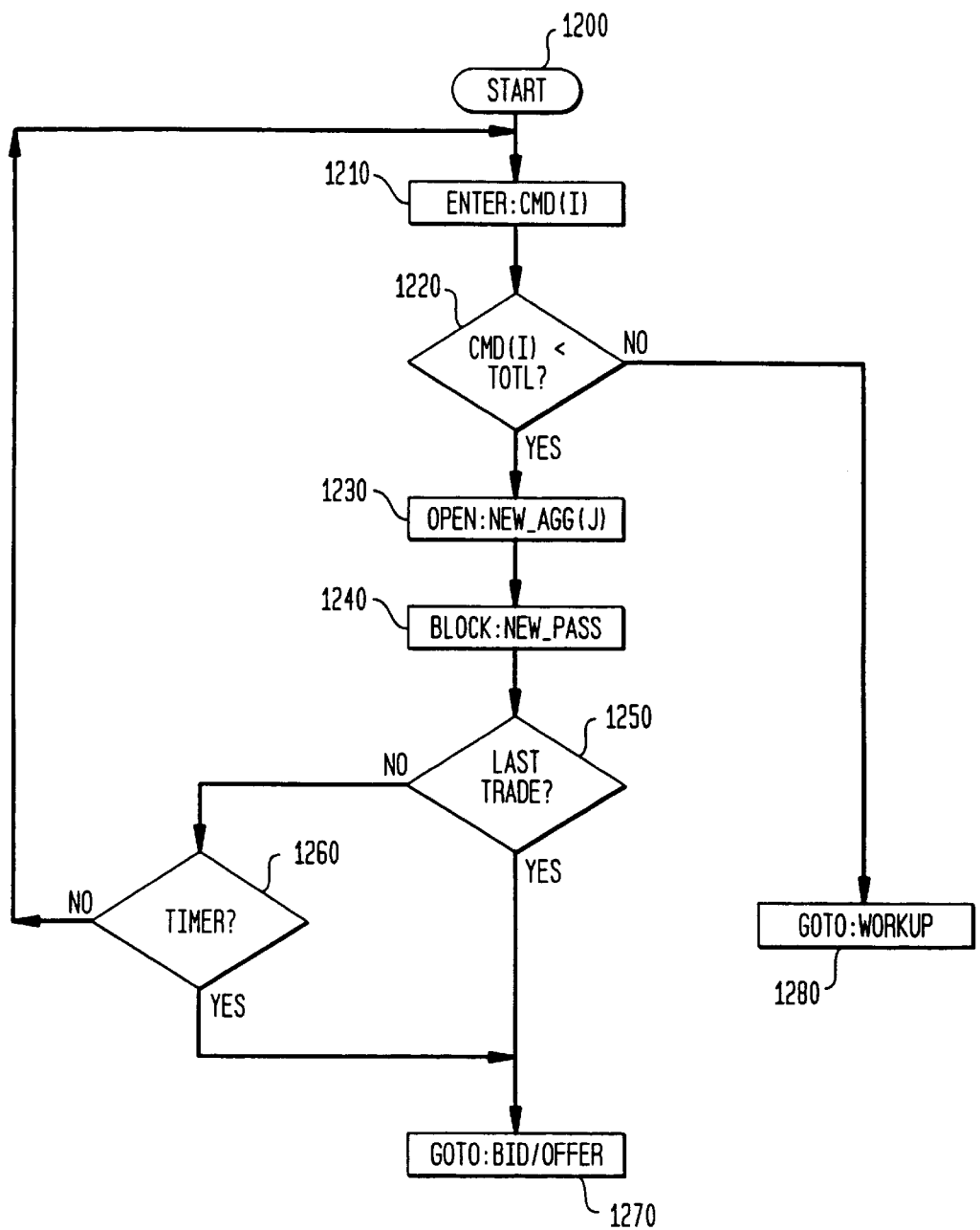
FIG. 10 is a logic diagram of a Workdown State according to the invention.

The Workdown State allows new Aggressors to complete the remaining unhit Bids on the Passive Side. Workdown State logic is shown in FIG. 10. Trading command CMD(I) is entered at 1210. At test 1220, the system checks whether the Trade is for less than the total Passive Side, TOTL. If not, logic branches at 1280 to the Workup State.

If the Trade is for less than the total Passive Side, test 1220 passes logic to 1230 where the system opens trading to new Aggressors in order to complete the pending Passive Side volume. However, no new Passive Side entries are entitled to Exclusive Time and are thus blocked at 1240 for the trade duration. Test 1250 determines whether the last Trade occurred and test 1260 determines whether the timer has lapsed. If either has occurred, Workdown is terminated and the process returns at 1270 to the Bid-Offer State.

Importantly, new Traders presenting on the Passive Side wait until all of the remaining original size is worked down—and their positions are held below the line. This is shown in QUADS 6A–6C.

| QUAD 6A | | | | | |
|---|---|---|---|---|---|
| >7.625.225 | | TZ | | | |
| 108.04 | | 15 | *108.04+ | | 25 |
| CUST | BID | BOT | CUST | OFFER | SOLD |
| 3001 | 5 | 0 | 3007 | 25 | 0 |
| 3002 | 10 | 0 | | | |
| TOTAL | 15 | 0 | | 25 | 0 |

QUAD 6A shows the Bid-Offer State with Participant CUST 3001 showing a bid of 5 million and Participant CUST 3002 showing a bid of 10 million. As the Aggressor, CUST 3001 Takes an Offer from CUST 3007, but for only 5 million of CUST 3007's showing of 25 million, leaving 20 million on the Passive Side (see QUAD 6B).

| QUAD 6B | | | | | |
|---|---|---|---|---|---|
| >7.625.225 | | TZ | | Refno 68118 | |
| 108.04 | | 11 | 108.04+ | TAK | |
| CUST | BUY | BOT | CUST | SELL | SOLD |
| *3001 | 0 | 5 | 3007 | 20 | 5 |
| TOTAL | 0 | 5 | | 20 | 5 |

At this point, if Participant CUST 3006 enters a 10 million Offer, CUST 3006 waits until the original Passive Side clears; CUST 3006 is thus kept below the line as the remaining size is worked down (see QUAD 6C).

| QUAD 6C | | | | | |
|---|---|---|---|---|---|
| >7.625.225 | | TZ | | Refno 68118 | |
| 108.04 CUST | BUY | 11 BOT | 108.04+ CUST | TAK SELL | 5 SOLD |
| *3001 | 0 | 5 | 3007 3006 | 20 10 | 5 0 |
| TOTAL | 0 | 5 | | 30 | 5 |

A Trade is cleared by either a system controlled timer or directly by a Participant when that price point attracts no further buyers or sellers. The clearing function resurrects a new Bid-Offer State, retaining original Makers from the Active Side (unless superseded) and the remaining untraded size from the Passive Side.

As discussed above, the system can provide enhanced performance allowing Price Improvement processing. Price Improvement provides a modified interactive Bid-Offer State and transforms the auction process into a multiple price auction process, where buy or sell orders are executed at one or more prices.

For Price Improvement, the Bid-Offer State reveals Participants willing to trade at prices above or below the current best market prices, particularly at sizes that may be significantly larger than the current sizes shown to the marketplace at the best Bid-Offer. All rules of the Bid-Offer State apply to each individual price stack or tier under Price Improvement. Priority is retained only in the top tier and by the best price, first bidder/offeror.

If an Aggressor acts on only one level, then the Workup or Workdown State (as previously described) is initiated and limited to that queue's price level. Even in this single level environment, a Trade may be "price improved" by system logic. This can occur, for example, if an Aggressor enters the Workup State. Price Improvement will be triggered by a passive Trader entering a better priced buy/sell. If the initial "best" passive Trader matches this new better price, the Trade will be consummated, but at a price determined by the system that is between the new better price and the original trade price, thus improving the price for both sides of this Trade. This is an example of Price Improvement initiated by the Passive Side via When State processing. The same system determined price would occur if the initial best passive Trader declined to match the new better price, turning the Trade over to the new Passive Side Trader.

This demonstrates that by becoming an Aggressor in a Price Improvement Trade, the Aggressor creates the possibility that a buy or sell order may be executed at a better price than is revealed by the current state of Bids and Offers displayed on the system. By doing so, the Aggressor initiates a modified Workup State (discussed above with respect to FIG. 8).

QUAD 7A shows three levels of Bids and Offers. The number of levels shown is a system parameter and is typically tied to the number of price increments on the Bid and Offer sides, that is, a cardinal arrangement (e.g., 1132 increments). An alternative tier arrangement includes an ordinal arrangement (e.g., "top five tiers"). In this example, all Participants are shown four bids totaling 67 million (CUSTs 2001 and 2002 showing a total of 2, CUST 2005 showing 20, and CUST 2012 showing 45). These bids range from 100.01 down to 100.00. QUAD 7A also shows five offers totaling 85 million (CUSTs 2007 and 2006 showing a total of 15, CUST 2008 showing 10, and CUSTs 2007 and 2011 showing a total of 60), ranging from 100.02 up to 100.03+. This contrasts with a single queue Bid-Offer State where only two Bids totaling 2 million at 100.01 and two Offers totaling 15 million at 100.02 would be shown.

An alternative arrangement (not shown) may not disclose all prices and sizes to all Participants. In this case, system logic controls the secondary tiers and buy and sell allocations.

| | | | QUAD 7A | | | | | |
|---|---|---|---|---|---|---|---|---|
| 100.01 | CUST | BID | 2 | BOT | 100.02 | CUST | 15 | OFFER | SOLD |
| | 2001 2002 | 1 1 | | 0 0 | | 2007 2006 | | 5 10 | 0 0 |
| 100.00+ | TOTAL | 2 | 20 | 0 | 100.03 | | 10 | 15 | 0 |
| | 2005 | 20 | | | | 2008 | | 10 | 0 |
| 100.00 | TOTAL | 20 | 45 | | 100.03+ | | 60 | 10 | 0 |
| | 2012 | 45 | | | | 2007 2011 | | 20 40 | |
| 100.45x.00 | TOTAL | 45 | | | | | | 60 | 0 |
| | 20 x .00+ 2x 2x .01 X 15x .02 10x.03 60x .03+ | | | | | | | | |

The logic of the Workup State with Price Improvement encourages Participants to reveal their trading intentions even away from the best price shown by allowing them to participate in a Price Improvement Trade if one is initiated. For example, Price Improvement will attach to a Participant who becomes an Aggressor away from the best market prices of 100.01 and 100.02 (of QUAD 7A). By revealing such intentions, the Aggressor gains first priority for potential price improvement during execution of the volume associated with the price surplus. Priority rankings provide the opportunity for purchases and sales at better prices than the best market of 100.01 and 100.02 by allowing the Buyers or Sellers' Surplus created upon the initiation of a Price Improvement Trade to be allocated among the Participants (i.e., allow the system to set a price-improvement price).

The Aggressor who initiates the Price Improvement Trade is granted protection by allowing contra-traders to buy or sell more at the higher or lower prices shown. This is accomplished by system logic that measures the surplus and allocates any available surplus among the Trader and contra-traders. By allowing one or both sides of the Trade to execute Trades at better prices than their respective revealed intentions, aggressive and/or passive Traders benefit. The system benefits the market by creating greater liquidity, improving revealed intentions of bidders and offerors, increasing depth of markets, allowing multiple price Trades, and forming the foundation for alternative commission fees.

Once trading commences, state sequencing follows the logic of a single price Trade. For example, in the Price Improvement Bid-Offer State shown in QUAD 7A, a new seller becomes the Aggressor with a command to sell 90 million down to 99.31 (i.e., 99+$^{31}$/32nds). In order to improve the seller's ability to sell at the "best price" available, the first best bidder whose priority is ranked on a price and time basis (or by a metric comprised therefrom or including size as well) is given the opportunity to buy additional volumes at an improved price after the 67 million has been Hit (i.e., 2 million sold at 100.01, 20 million sold at 100.00+, and 45 million sold at 100.00). By offering to sell a total of 90 million down to 99.31, the seller sells the first 67 million and has "intent" to sell 23 million more. The first best bidder can now execute more at an improved price. The level of improvement is allocated between the bid price of 100.01 (i.e., 100+$^{1}$/32nd) and the 99.31 reservation price. Thus, if buyer CUST 2001 trades the remaining 23 million with the 99.31 seller, then a Price Improvement Trade of 23 Hit at 100.00 is consummated. Here, buyer CUST 2001 maintains priority by committing to buy 23 million more at the bid level of 100.01. However, the actual trade price is, for example, 100.00, providing the buyer with 0.01 ($^{1}$/32) price improvement and the seller with a like 0.01 price improvement over the reservation sale price of 99.31.

System logic has apportioned the Trader Surplus between the aggressive and passive sides of the Trade, benefitting both parties. System logic could also allocate the surplus alternatively (e.g., providing the Aggressor with $^{2}$/3, all, or none of the surplus). The allocation mechanism could also dynamically change depending on the size of the Trade or other customer or trade characteristics. The system flashes the sequence of three Trades, 2@100.01, 20@100.00+, 68 (45+23)@100.00, preferably with highlighting to indicate that the sequence is a set of Price Improvement Trades. Alternatively, the total Trade at the average price could be displayed. At the end of the Trade, system logic returns to the Bid-Offer State.

Under Price Improvement processing, separate mechanisms present and display multiple Bid-Offers at different price levels. A first option is to remove all out of market Bid-Offers (i.e., all inferior offerings are not displayed). A second option provides the bidder with a choice as to whether the bidder's inferior bid is left on the display or removed when topped with a better price. A third option is to display all bids on screen even when topped. This forms a "good till cancel" offering. Another option allows Participants to customize their Bids and Offers under system controlled parameters.

Price Improvement processing also permits priority preserved trading, which occurs in a When State. The When State occurs when a non-priority Participant initiates or responds to a trading command. System logic triggers the When State allowing the priority bidder (e.g., the one with the first best price on the passive market side) to intercede and assume control of the Trade. During the When State, a timer controls a period of time during which the priority bidder can decide whether to intercede. The original buyer (whose trading command initiated the When State) is placed right behind the priority bidder, and other non-priority buyers are placed in sequence behind the first Aggressor. If the priority bidder does not intercede, logic turns the Trade over to the ranked list of buyers and the Trade moves to the Workup or Workdown State for completion. By interceding, the first best bidder maintains priority by matching the best price among the When Take Trades.

By initiating a Price Improvement here, the Hit, highlighted by video attribute, is for more size than is shown on the number of tiers of Bids or Offers available for Price Improvement.

In order to provide a greater and more diverse opportunity for Price Improvement and to protect the Price Improvement Aggressor, all buy and sell orders received during Exclusive Time are ranked and matched to provide the greatest amount of price protection to the Price Improvement Aggressor. Because of multi-levels of Bids and Offers, the first best bidder/offeror maintains priority only if that bidder/offeror responds at the Aggressor's price, or, if necessary, matches the best When Take/Hit price.

Referring to QUAD 7B, Participant CUST 2008 becomes the Aggressor by initiating a Price Improvement Trade by committing to sell 90 million down to a price of, for example, 99.31. During Exclusive Time, Participant CUST 2001 commits to buy 5 million more at 100.01, Participant CUST 2009 commits to buying 20 million at 100.01+, and Participant CUST 2002 commits to buying 5 million more at 100.01. Customer 2001 does not then match the buy price of 100.01+.

| QUAD 7B | | | | | | |
|---|---|---|---|---|---|---|
| 100.01 to .00 | CUST | HIT 67 BUY | BOT | CUST | SELL | SOLD |
| 100.01+ | 2009 | 20 | | | | |
| 100.01 | 2001 | 5 | 1 | 2008 | 23 | 67 |
|  | 2002 | 5 | 1 | | | |
| TOTAL | | | 2 | | | |
| 100.00+ | 2005 | 0 | 20 | | | |
| TOTAL | | | 20 | | | |
| 100.00 | 2012 | 0 | 45 | | | |
| TOTAL | | | 67 | | | |

CUST 2001 has a priority over CUSTs 2002 and 2009 by having been the original best bidder and commits to buying more at CUST 2001's original price. At the end of Exclusive Time, 20 of the 23 million to be sold are matched with the best buys shown, thus 20 million are sold to 2009. The remaining 3 million are sold to CUST 2001. By not matching the 100.01+price, CUST 2001 only obtains the 3 million. By maintaining price and time priority, price improvement is obtained and the Aggressor is protected. The Trades are shown in QUAD 7C.

| QUAD 7C | | | | | |
|---|---|---|---|---|---|
| 100.00 X 45 .00 + X23 | | | .01X22HIT | | |
| | CUST | BUY | BOT | CUST | SELL | SOLD |
| 100.01 | 2001 | | 1 | 2008 | | 22 |
| | 2002 | | 1 | | | |
| | 2009 | | 20 | | | |
| TOTAL | | | 22 | | | 22 |
| 100.00+ | 2005 | | 20 | 2008 | | 23 |
| | 2001 | | 3 | | | |
| TOTAL | | | 23 | | | |
| 100.00 | 2012 | | 45 | 2008 | | 45 |
| TOTAL | | | 45 | | | 45 |
| TOTAL | | | 90 | | | 90 |

Participants interact with system logic during Price Improvement trading via an input device. Various input devices can be used as exemplified by the specialized keyboard shown in FIG. 12. The keyboard includes special LCD keys, whose function and display is directly tied to the state of the trading processor. The keyboard has two vertical rows of 5 LCD keys each and a horizontal row of 7 LCD keys. The horizontal row of LCD keys dynamically displays the three different price levels available on both the Bid and Offer sides. This row is called the "Price Row." This display updates in real time as prices change in the trading processor. The center key in this row shows a price incrementor value. The most appropriate incrementor value is determined by the trading processor based on the range of the Spread between the best and worst markets. This incrementor value is also updated in real time as prices change. The bid prices travel to the left of the keyboard from the center key in order of best to worst. Similarly, the Offer prices travel to the right. As different price levels appear in the Price Improvement Bid-Offer State, they are displayed in the Price Row. To facilitate data entry and quick reaction to the market, a Participant simply presses one of the LCD keys to chose which price level at which to trade. After selecting the price, the Participant chooses one of the action keys represented by the vertical row of the LCD keys. If the Participant wants to trade below or above the current shown prices in the market, the Participant can use the incrementor key to indicate how far above or below the prices to go.

The capabilities of the foregoing keyboard arrangement can be realized in several alternative embodiments. For example, the input commands can be arranged on a touch screen or touch pad transducer (e.g., a "mouse"). Other vehicles for inputting commands include voice command, voice activated navigation, and other "location" devices known in the art. The use of the term "key" is meant to include a command or data entry trigger (i.e., a device or switch) that when activated accomplishes a particular task.

Figure 11:
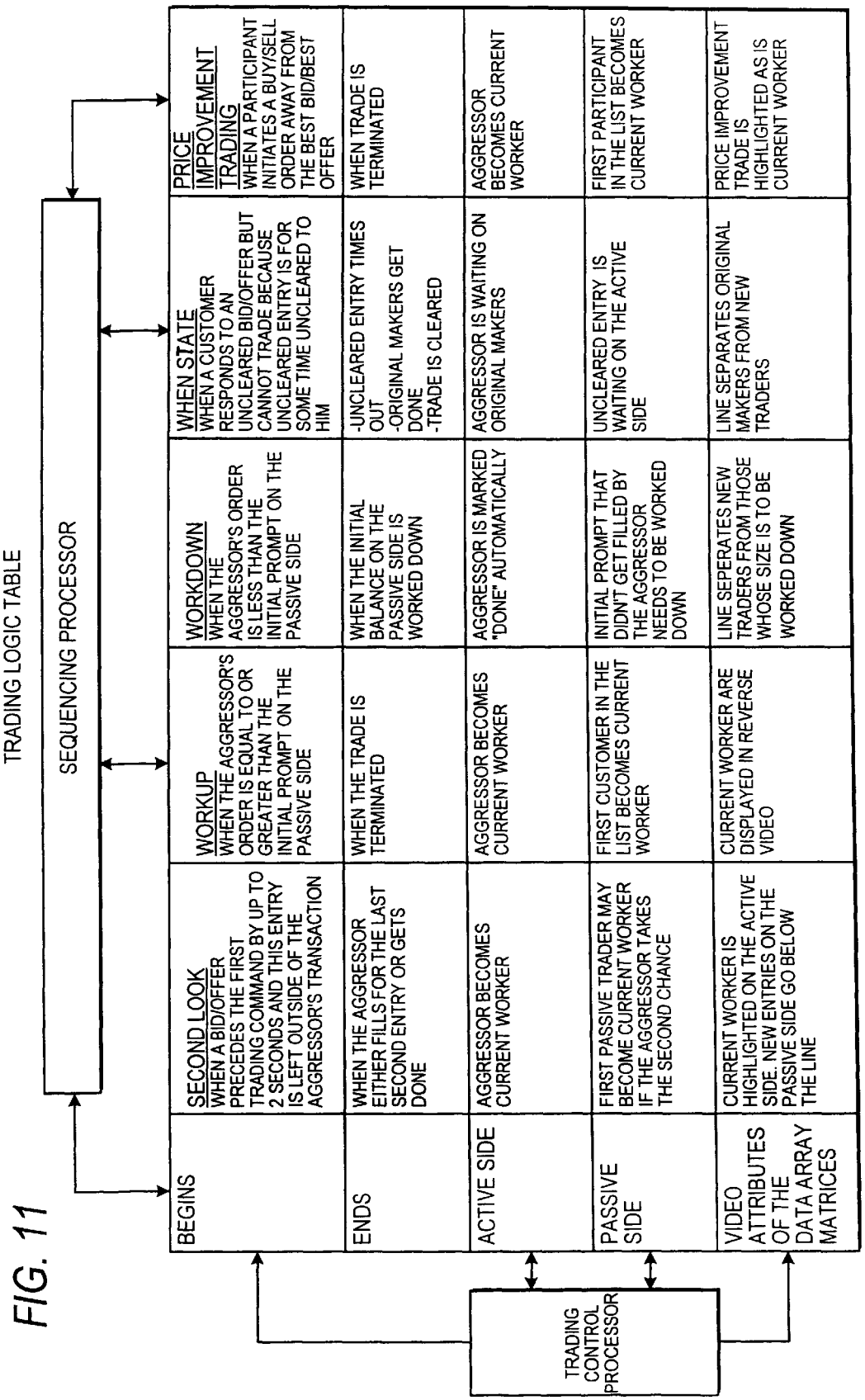
FIG. 11 is a trading logic summary table according to the invention.

The logic associated with the five states discussed herein is summarized in tabular form in FIG. 11. Features of the foregoing system have resulted in a dramatic increase in efficiency and in a reduction of trading order errors.

Figure 3A:
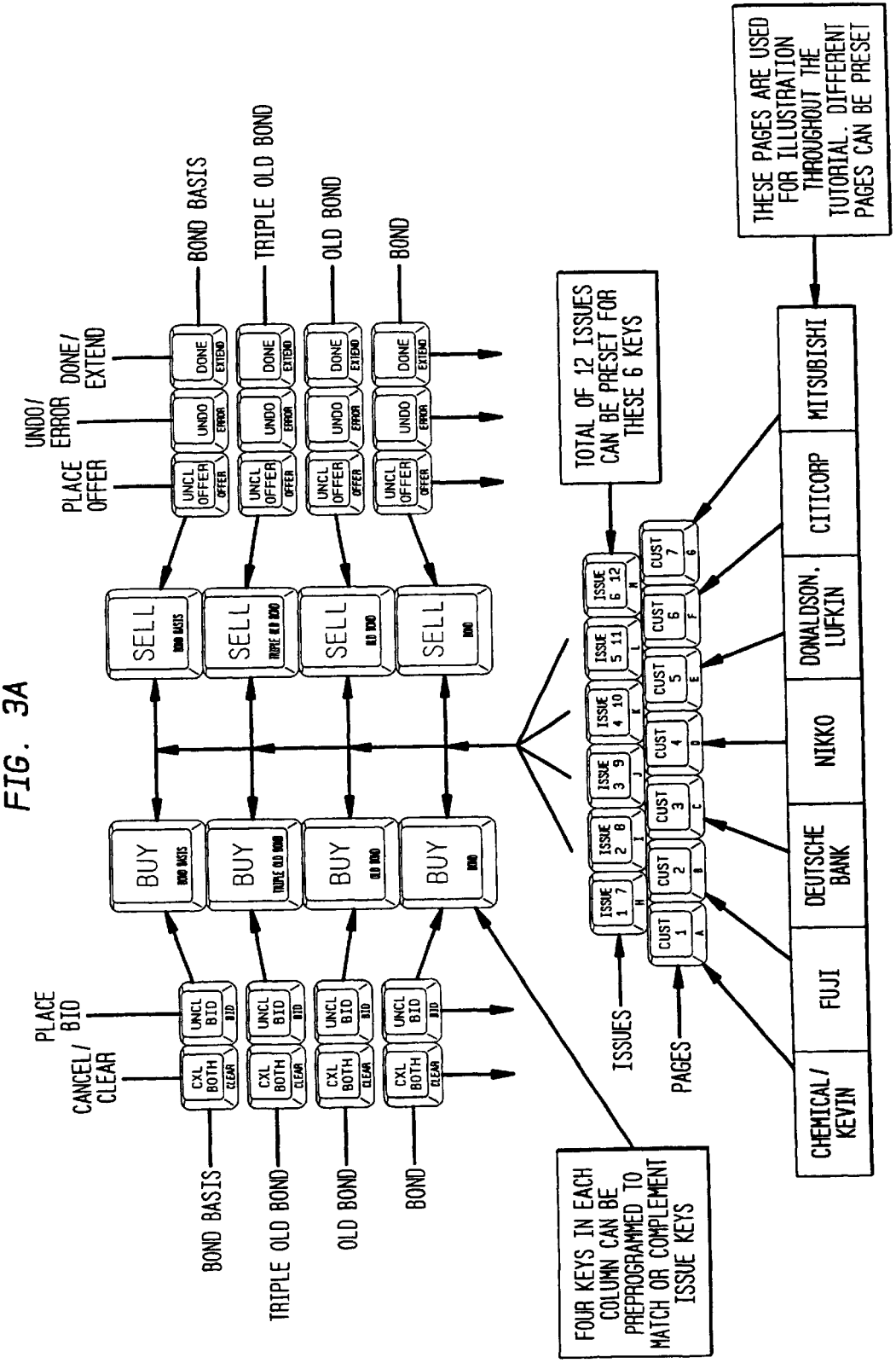
FIGS. 3A–B are drawings of dedicated keypads according to the invention.
Figure 3B:
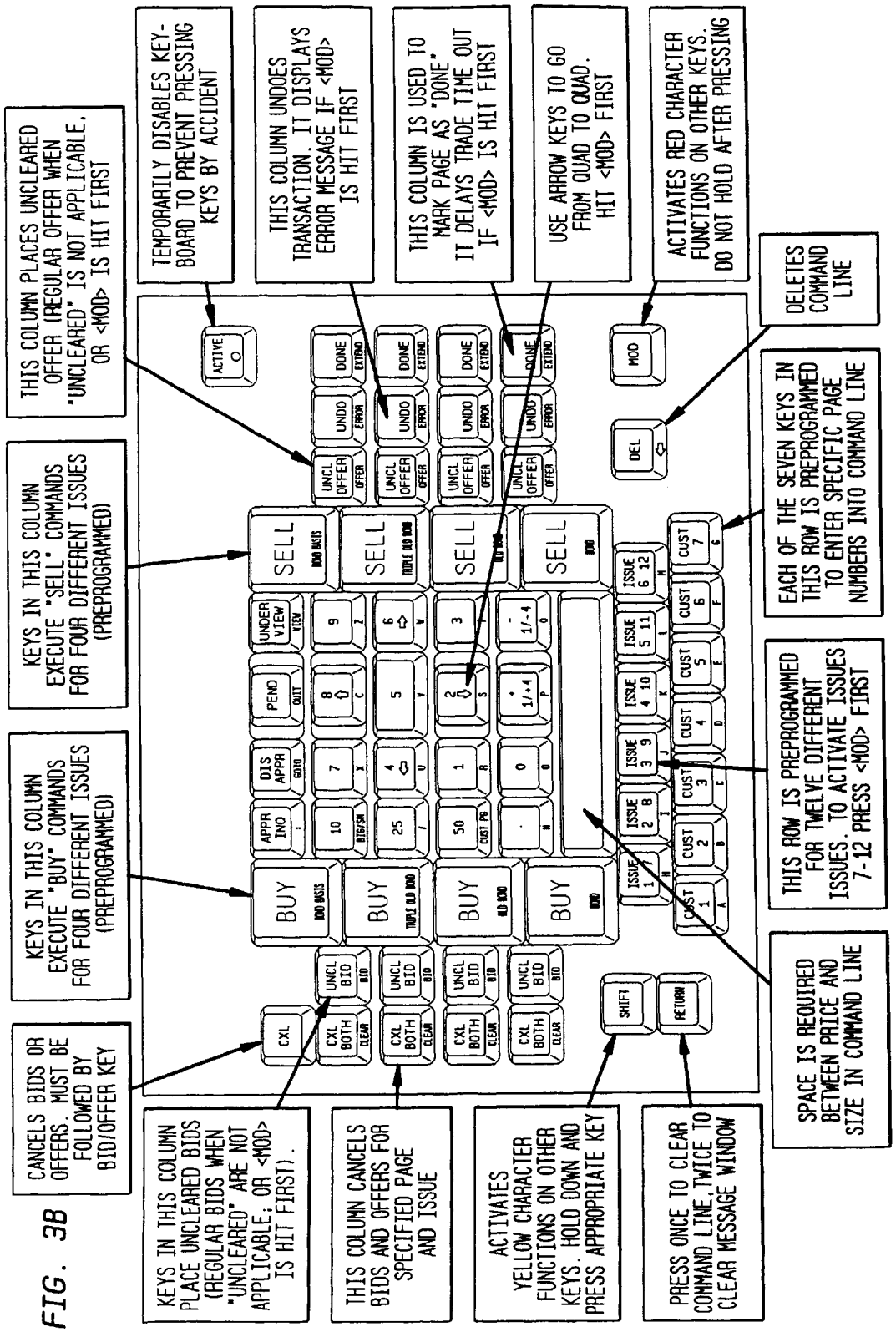
Figure 12:
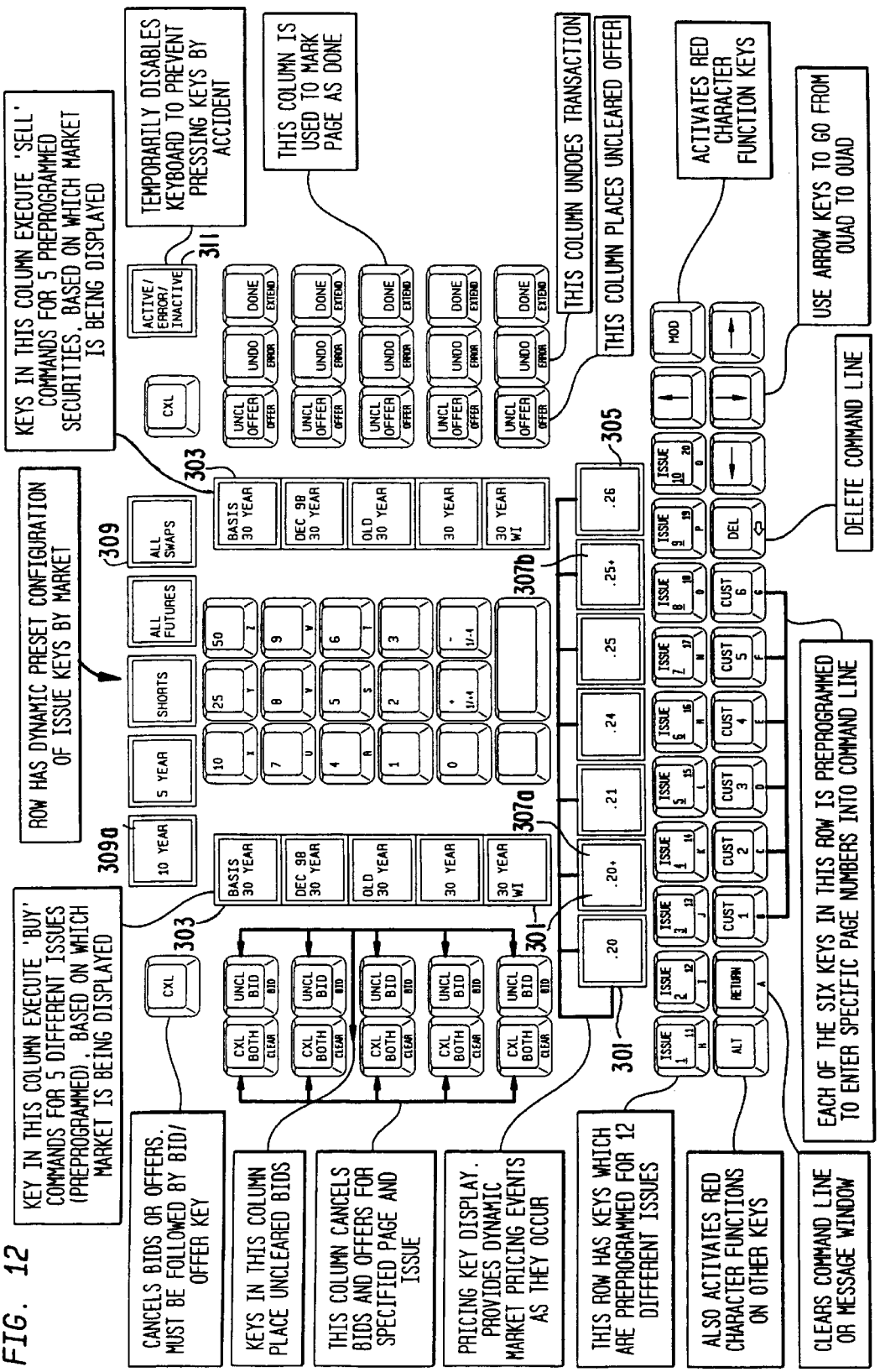
FIG. 12 is a drawing of an interactive keyboard according to the invention.

The often frenetic environment of bidding, offering, and trading, and the entry of commands on the preferred dedicated keypads shown in FIGS. 3A–B and 12, and the likelihood of Participants changing their minds, all contribute to the possibility that an erroneous Trade may be made. More particularly, errors can arise because of an incorrect entry in the system, a miscommunication, and the like. These errors can often force a "principal" Participant into an unintended position during a Trade.

The invention preferably provides ways for a Participant to effectively "undo" a Trade, either by canceling a pending order, or rolling back executions during a trade State. As shown in FIGS. 3A–B and 12, keypads preferably provide cancel (CXL), DONE, and UNDO keys to facilitate this process. The function of these keys while the system is in a particular state is described below. Note that the names of these keys are arbitrary and any input means can be used to effect the desired actions.

In the Bid-Offer State, the CXL command removes a Maker's existing markets from one or more instruments.

In the When State, CXL removes a Maker's markets only if there are no pending active BUY or SELL orders against it. Also, DONE removes from trading lists a potential Aggressor, as well as trade Participants, before orders are matched.

During the Workdown State, CXL removes any remaining passive Maker's markets. DONE performs the same function as CXL and also allows the Passive trading Participants in the Workdown State to remove themselves from trading lists, thus effectively removing their committed sizes before the system has had a chance to execute them. The UNDO function "unrolls" the Trade and reduces the size shown to Participants when executed during a predefined time period after the initial Trade. Additionally, the UNDO function proportionately reduces the amount traded by all passive Makers. The restriction of a predefined time period discourages a Trader from taking unfair advantage of this correction facility. Analogously, if no more than one Trader participated in the Trade, the UNDO function causes the Trader to join the contra-side for the size desired to be undone. The UNDO function can be invoked at any time by any Participant on the Active Side or the Passive Side; system logic preferably maintains the fairness of this trading protocol.

During the Workup State, the DONE function can remove a Participant from the Active Side, Passive Side, or both simultaneously, regardless of the size traded or solicited. In sum, the DONE function removes the Participant from the Trade. The UNDO function can also roll back the Trade provided that the first active Trader has executed this function within a predefined time period following the Trade. If the UNDO function is not invoked during this predefined period, or the Trader is not the first active Trader, then the Trader is entered immediately in the queue to buy or sell on the contra-side. Preferably, the Trader is placed at the top of the list such that the UNDO function can be effectively invoked immediately, provided there is a contra-trader. Most preferably, the rights of the first Active and Passive Traders are maintained to assure fairness.

Thus it is seen that automated price improvement protocol systems and methods are presented. One skilled in the art will appreciate that the invention can be practiced by other than the described embodiments, which are presented for purposes of illustration and not of limitation, and the invention is limited only by the claims which follow.

We claim:

1. A method of electronic interactive buying and selling of items via a data processing system comprising a server and a plurality of workstations in communication with said server, said workstations used by Participants for entering commands having prices and volumes, said server receiving said commands, said method comprising:

receiving a first bid command having a first price and a first volume for an item;

receiving a second bid command having a second price and a second volume for said item;

receiving a sell command having a third price and a third volume for said item, said third volume larger than the sum of said first and second volumes, said third price lower than said first price and said second price;

executing a transaction at said first price for said first volume in response to receiving said sell command;

executing a transaction at said second price for said second volume in response to receiving said sell command;

setting a transaction price between said third price and the lower of said first and second prices at which a transaction for the difference between said third volume and the sum of said first and second volumes can be completed; and providing a limited time period during which only the Participant that entered the higher of said first and second prices can execute a transaction at said set transaction price.

2. A method of electronic interactive buying and selling of items via a data processing system comprising a server and a plurality of workstations in communication with said server, said workstations used by Participants for entering commands having prices and volumes, said server receiving said commands, said method comprising:

receiving a first offer command having a first price and a first volume for an item;

receiving a second offer command having a second price and a second volume for said item;

receiving a buy command having a third price and a third volume for said item, said third volume larger than the sum of said first and second volumes, said third price higher than said first price and said second price;

executing a transaction at said first price for said first volume in response to receiving said buy command;

executing a transaction at said second price for said second volume in response to receiving said buy command;

setting a transaction price between said third price and the higher of said first and second prices at which a transaction for the difference between said third volume and the sum of said first and second volumes can be completed; and providing a limited time period during which only the Participant that entered the lower of said first and second prices can execute a transaction at said set transaction price.

3. A method of electronic interactive buying and selling of items via a data processing system comprising a server and a plurality of workstations in communication with said server, said workstations used by Participants for entering commands having prices and volumes, said server receiving said commands, said method comprising:

receiving a bid command having a first price and a first volume for an item;

receiving a sell command having a second price and a second volume for said item, said second volume larger than said first volume, said second price lower than said first price;

executing a transaction at said first price for said first volume in response to receiving said sell command;

receiving a buy command having a third price that is higher than said second price and a volume equal to at least a portion of the difference between said first and second volumes;

calculating a transaction price between said first and second prices in response to receiving said buy command at which a transaction for said portion is completed; and displaying an indication of price improvement availability in response to receiving said buy command.

4. A method of electronic interactive buying and selling of items via a data processing system comprising a server and a plurality of workstations in communication with said server, said workstations used by Participants for entering commands having prices and volumes, said server receiving said commands, said method comprising:

receiving an offer command having a first price and a first volume for an item;

receiving a buy command having a second price and a second volume for said item, said second volume larger than said first volume, said second price higher than said first price;

executing a transaction at said first price for said first volume in response to receiving said buy command;

receiving a sell command having a third price that is lower than said second price and a volume equal to at least a portion of the difference between said first and second volumes;

calculating a transaction price between said second and third prices in response to receiving said sell command at which a transaction for said portion is completed; and displaying an indication of price improvement availability in response to said sell command.

5. A method of electronic interactive buying and selling of items via a data processing system comprising a server and a plurality of workstations in communication with said server, said workstations used by Participants for entering commands having prices and volumes, said server receiving said commands, said method comprising:

receiving a first bid command having a first price and a first volume for an item;

receiving a second bid command having a second price and a second volume for said item;

receiving a sell command having a third price and a third volume for said item, said third volume larger than the sum of said first and second volumes, said third price lower than said first price and said second price;

executing a transaction at said first price for said first volume in response to receiving said sell command;

executing a transaction at said second price for said second volume in response to receiving said sell command;

receiving a buy command having a fourth price that is higher than said third price and a volume equal to at least a portion of the difference between said third volume and the sum of said first and second volumes;

setting a transaction price between said third price and said fourth price in response to receiving said buy command at which a transaction for said portion is completed; and providing a limited time period during which only the Participant that entered the higher of said first and second prices can execute a transaction at said set transaction price.

6. A method of electronic interactive buying and selling of items via a data processing system comprising a server and a plurality of workstations in communication with said server, said workstations used by Participants for entering commands having prices and volumes, said server receiving said commands, said method comprising:

receiving a first bid command having a first price and a first volume for an item;

receiving a second bid command having a second price and a second volume for said item;

receiving a sell command having a third price and a third volume for said item, said third volume larger than the sum of said first and second volumes, said third price lower than said first price and said second price;

executing a transaction at said first price for said first volume in response to receiving said sell command;

executing a transaction at said second price for said second volume in response to receiving said sell command;

receiving a buy command having a fourth price that is higher than said third price and a volume equal to at least a portion of the difference between said third volume and the sum of said first and second volumes;

setting a transaction price between said third price and said fourth price in response to receiving said buy command at which a transaction for said portion is completed; and displaying an indication of price improvement availability in response to receiving said buy command.

7. A method of electronic interactive buying and selling of items via a data processing system comprising a server and a plurality of workstations in communication with said server, said workstations used by Participants for entering commands having prices and volumes, said server receiving said commands, said method comprising:

receiving a first offer command having a first price and a first volume for an item;

receiving a second offer command having a second price and a second volume for said item;

receiving a buy command having a third price and a third volume for said item, said third volume larger than the sum of said first and second volumes, said third price higher than said first price and said second price;

executing a transaction at said first price for said first volume in response to receiving said buy command;

executing a transaction at said second price for said second volume in response to receiving said buy command;

receiving a sell command having a fourth price that is lower than said third price and a volume equal to at least a portion of the difference between said third volume and the sum of said first and second volumes;

setting a transaction price between said third price and said fourth price in response to receiving said sell command at which a transaction for said portion is completed; and providing a limited time period during which only the Participant that entered the lower of said first and second prices can execute a transaction at said set transaction price.

8. A method of electronic interactive buying and selling of items via a data processing system comprising a server and a plurality of workstations in communication with said server, said workstations used by Participants for entering commands having prices and volumes, said server receiving said commands, said method comprising:

receiving a first offer command having a first price and a first volume for an item;

receiving a second offer command having a second price and a second volume for said item;

receiving a buy command having a third price and a third volume for said item, said third volume larger than the sum of said first and second volumes, said third price higher than said first price and said second price;

executing a transaction at said first price for said first volume in response to receiving said buy command;

executing a transaction at said second price for said second volume in response to receiving said buy command;

receiving a sell command having a fourth price that is lower than said third price and a volume equal to at least a portion of the difference between said third volume and the sum of said first and second volumes;

setting a transaction price between said third price and said fourth price in response to receiving said sell command at which a transaction for said portion is completed; and displaying an indication of price improvement availability in response to receiving said sell command.

9. A method of electronic interactive buying and selling of items via a data processing system comprising a server and a plurality of workstations in communication with said server, said workstations used by Participants for entering commands having prices and volumes, said server receiving said commands, said method comprising:

receiving a first bid command having a first price and a first volume for an item;

receiving a second bid command having a second price and a second volume for said item;

receiving a sell command having a third price and a third volume for said item, said third volume larger than the sum of said first and second volumes, said third price lower than said first price and said second price;

executing a transaction at said first price for said first volume in response to receiving said sell command;

executing a transaction at said second price for said second volume in response to receiving said sell command;

setting a transaction price between said third price and the lower of said first and second prices at which a transaction for the difference between said third volume and the sum of said first and second volumes can be completed; and displaying an indication of price improvement availability in response to receiving said sell command.

10. A method of electronic interactive buying and selling of items via a data processing system comprising a server and a plurality of workstations in communication with said server, said workstations used by Participants for entering commands having prices and volumes, said server receiving said commands, said method comprising:

receiving a first offer command having a first price and a first volume for an item;

receiving a second offer command having a second price and a second volume for said item;

receiving a buy command having a third price and a third volume for said item, said third volume larger than the sum of said first and second volumes, said third price higher than said first price and said second price;

executing a transaction at said first price for said first volume in response to receiving said buy command;

executing a transaction at said second price for said second volume in response to receiving said buy command;

setting a transaction price between said third price and the higher of said first and second prices at which a transaction for the difference between said third volume and the sum of said first and second volumes can be completed; and displaying an indication of price improvement availability in response to receiving said buy command.

11. A method of electronic interactive buying and selling of items via a data processing system comprising a server and a plurality of workstations in communication with said server, said workstations used by Participants for entering commands having prices and volumes, said server receiving said commands, said method comprising:

receiving a bid command having a first price and a first volume for an item;

receiving a sell command having a second price and a second volume for said item, said second volume larger than said first volume, said second price lower than said first price;

executing a transaction at said first price for said first volume in response to receiving said sell command;

receiving a buy command having a third price that is higher than said second price and a volume equal to at least a portion of the difference between said first and second volumes;

calculating a transaction price between said first and second prices in response to receiving said buy command at which a transaction for said portion is completed; and providing a limited time period during which only the Participant that entered the higher of said first and third prices can execute a transaction at said set transaction price.

12. A method of electronic interactive buying and selling of items via a data processing system comprising a server and a plurality of workstations in communication with said server, said workstations used by Participants for entering commands having prices and volumes, said server receiving said commands, said method comprising:

receiving an offer command having a first price and a first volume for an item;

receiving a buy command having a second price and a second volume for said item, said second volume larger than said first volume, said second price higher than said first price;

executing a transaction at said first price for said first volume in response to receiving said buy command;

receiving a sell command having a third price that is lower than said second price and a volume equal to at least a portion of the difference between said first and second volumes;

calculating a transaction price between said second and third prices in response to receiving said sell command at which a transaction for said portion is completed; and providing a limited time period during which only the Participant that entered the lower of said first and third prices can execute a transaction at said set transaction price.

* * * * *